United States Patent
Fu et al.

(10) Patent No.: US 11,363,658 B2
(45) Date of Patent: Jun. 14, 2022

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventors: Zhe Fu, Guangdong (CN); Qianxi Lu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 17/469,619

(22) Filed: Sep. 8, 2021

(65) Prior Publication Data

US 2021/0410218 A1 Dec. 30, 2021

Related U.S. Application Data

(63) Continuation of application No. PCT/CN2019/127665, filed on Dec. 23, 2019.

(51) Int. Cl.
*H04W 76/15* (2018.01)
*H04W 76/22* (2018.01)
(Continued)

(52) U.S. Cl.
CPC ......... *H04W 76/15* (2018.02); *H04W 28/085* (2013.01); *H04W 76/22* (2018.02); *H04W 80/02* (2013.01)

(58) Field of Classification Search
CPC ... H04W 76/15; H04W 28/085; H04W 76/22; H04W 80/02
See application file for complete search history.

(56) References Cited

U.S. PATENT DOCUMENTS

2018/0352556 A1* 12/2018 Loehr ............... H04W 28/0205
2019/0053325 A1 2/2019 Yu et al.
(Continued)

FOREIGN PATENT DOCUMENTS

| CN | 109687944 A | 4/2019 |
|----|-------------|--------|
| EP | 3737154 A1 | 11/2020 |

OTHER PUBLICATIONS

3GPP TS 38.323 V16.2.0 (Sep. 2020)—3rd Generation Partnership Project; Technical Specification Group Radio Access Network; NR; Packet Data Convergence Protocol (PDCP) specification (Release 16) (40 pages).

(Continued)

*Primary Examiner* — Will W Lin
(74) *Attorney, Agent, or Firm* — Perkins Coie LLP

(57) ABSTRACT

Implementations of the present disclosure provide a wireless communication method and a terminal device. In the case that a duplicate transmission of a first bearer is deactivated, a terminal device can determine an RLC entity of the split transmission. The wireless communication method includes: in the case that a duplicate transmission of a first bearer is deactivated, a terminal device determines, according to cell groups corresponding to a primary RLC entity and a secondary RLC entity in at least three RLC entities configured for the first bearer, an RLC entity that transmits a PDCP PDU, and/or a terminal device determines, according to cell groups corresponding to a primary RLC entity and a secondary RLC entity in at least three RLC entities configured for the first bearer, an MAC entity that maps the data amount of a PDCP to be transmitted.

2 Claims, 9 Drawing Sheets

(51) Int. Cl.
*H04W 28/08* (2009.01)
*H04W 80/02* (2009.01)

(56) References Cited

U.S. PATENT DOCUMENTS

| | | | |
|---|---|---|---|
| 2019/0215719 A1 | 7/2019 | Wei et al. | |
| 2019/0253924 A1 | 8/2019 | Kim et al. | |
| 2020/0236734 A1* | 7/2020 | Wei | H04W 76/27 |
| 2020/0314690 A1* | 10/2020 | Kim | H04W 28/06 |
| 2021/0144583 A1* | 5/2021 | Xiao | H04W 28/04 |

OTHER PUBLICATIONS

3GPP TS 38.331 V16.2.0 (Sep. 2020)—3rd Generation Partnership Project; Technical Specification Group Radio Access Network; NR; Radio Resource Control (RRC) protocol specification (Release 16) (916 pages).

3GPP TSG RAN Meeting #83—RP-190728—Shenzhen, China, Mar. 18-21, 2019—Nokia, Nokia Shanghai Bell, NewWID: Support of NR Industrial Internet of Things (IoT) (7 pages).

3GPP TSG-RAN WG2 Meeting #108—R2-1914784—Reno, USA, Nov. 18-22, 2019 Revision of R2-1913244—Huawei, HiSilicon, Network controlled activation/deactivation of PDCP duplication (4 pages).

3GPP TSG-RAN WG2 Meeting #108—R2-1915862—Reno, NV, USA, Nov. 18-Nov. 22, 2019—LG Electronics Inc., Remaining issues in PDCP duplication (4 pages).

3GPP TSG-RAN WG2 Meeting #108—Reno, US, Nov. 18-22, 2019—R2-1916355—Nokia (Rapporteur)—R2, Stage-2 running CR for support of NR Industrial IoT WI (17 pages).

International Search Report dated Sep. 11, 2020 of PCT/CN2019/127665 (6 pages).

Ericsson "Configuration and RRC aspects of PDCP Duplication" Tdoc R2-1914760; 3GPP TSG-RAN WG2 #108; Reno, US. Nov. 18-22, 2019. 9 pages.

Extended European Search Report for European Application No. 19957176.1 dated Mar. 23, 2022. 8 pages.

* cited by examiner

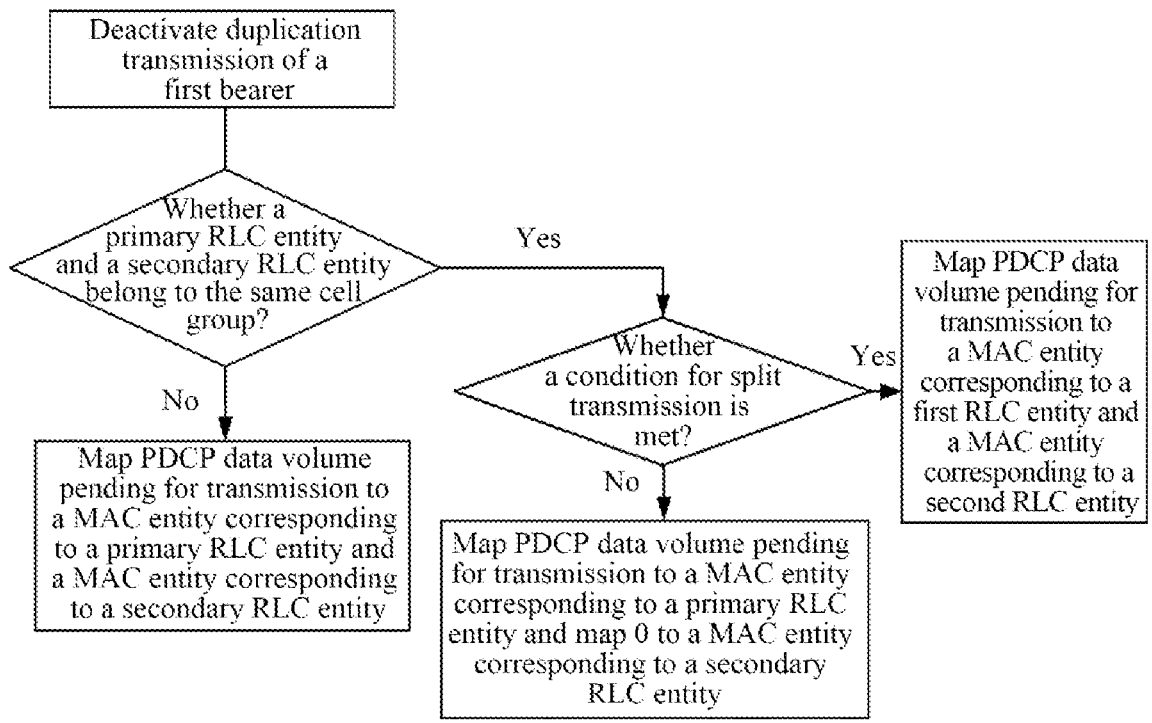

FIG. 11

300 — In a case that duplication transmission of a first bearer is deactivated, a terminal device determines cell groups corresponding to a primary RLC entity and a secondary RLC entity among at least three RLC entities configured for the first bearer according to indication information for the first bearer ~ S310

The terminal device determines an RLC entity for transmitting a PDCP PDU according to the cell groups corresponding to the primary RLC entity and the secondary RLC entity among the at least three RLC entities, and/or the terminal device determines or indicates PDCP data volume pending for transmission ~ S320

FIG. 12

WIRELESS COMMUNICATION METHOD AND TERMINAL DEVICE

CROSS-REFERENCE TO RELATED APPLICATION

The present application is a continuation application of International PCT Application No. PCT/CN2019/127665, filed on Dec. 23, 2019, the entire content of which is hereby incorporated by reference.

TECHNICAL FIELD

Implementations of the present disclosure relate to the field of communications, and more particularly, to a wireless communication method and a terminal device.

BACKGROUND

In a New Radio (NR) system, in order to improve reliability of data transmission, a terminal device may adopt a mode of duplication transmission. Specifically, in Release 15 (Rel-15), one bearer may be configured with two Radio Link Control (RLC) entities. A Packet Data Convergence Protocol (PDCP) layer corresponding to the bearer may copy a PDCP Protocol Data Unit (PDU) into two identical copies, for example one is a PDCP PDU and another is a Duplicated PDCP PDU. The two PDCP PDUs pass through different RLC layers and Media Access Control (MAC) layers, and finally are transmitted to a network device through an air interface. In addition, when duplication transmission is deactivated and a condition for split transmission is met, the terminal device may transmit split data through two RLC entities corresponding to the bearer, that is, different data are transmitted through different RLC entities.

In Release 16 (Rel-16, R16), it is considered to configure more RLC entities for a bearer, such as four RLC entities. In this case, how to determine an RLC entity for split transmission is an urgent problem to be solved.

SUMMARY

Implementations of the present disclosure provide a wireless communication method and a terminal device, and the terminal device may determine an RLC entity for split transmission in a case that duplication transmission of a first bearer is deactivated.

In a first aspect, there is provided a wireless communication method, wherein the method includes: in a case that duplication transmission of a first bearer is deactivated, a terminal device determines an RLC entity for transmitting a PDCP PDU according to cell groups corresponding to a primary RLC entity and a secondary RLC entity among at least three RLC entities configured for the first bearer, and/or determines an MAC entity to which PDCP data volume pending for transmission is mapped according to cell groups corresponding to a primary RLC entity and a secondary RLC entity among at least three RLC entities configured for the first bearer.

In a second aspect, there is provided a wireless communication method, wherein the method includes: in a case that duplication transmission of a first bearer is deactivated, a terminal device determines cell groups corresponding to a primary RLC entity and a secondary RLC entity among at least three RLC entities configured for the first bearer according to indication information for the first bearer; the terminal device determines an RLC entity for transmitting a PDCP PDU according to the cell groups corresponding to the primary RLC entity and the secondary RLC entity among the at least three RLC entities, and/or the terminal device determines an MAC entity to which PDCP data volume pending for transmission is mapped according to the cell groups corresponding to the primary RLC entity and the secondary RLC entity among the at least three RLC entities.

In a third aspect, there is provided a wireless communication method, wherein the method includes: in a case that duplication transmission of a first bearer is deactivated and there is no secondary RLC entity or no secondary RLC entity is configured among at least three RLC entities configured for the first bearer, a terminal device determines whether to carry out split transmission, or determines an RLC entity for transmitting a PDCP PDU.

In a fourth aspect, there is provided a terminal device configured to perform the method in the first aspect or various implementations thereof.

Specifically, the terminal device includes function modules configured to perform the method of the first aspect described above or any of various implementations thereof.

In a fifth aspect, there is provided a terminal device configured to perform the method in the second aspect or various implementations thereof.

Specifically, the terminal device includes function modules configured to perform the method in the above second aspect or various implementations thereof.

In a sixth aspect, there is provided a terminal device configured to perform the method in the third aspect or various implementations thereof.

Specifically, the terminal device includes function modules configured to perform the method in the third aspect or various implementations thereof.

In a seventh aspect, a terminal device is provided, including a processor and a memory. The memory is configured to store a computer program, and the processor is configured to call and run the computer program stored in the memory to perform the method in the above first aspect or various implementations thereof.

In an eighth aspect, a terminal device is provided, including a processor and a memory. The memory is configured to store a computer program, and the processor is configured to call and run the computer program stored in the memory to perform the method of the second aspect or various implementations thereof.

In a ninth aspect, there is provided a terminal device, including a processor and a memory. The memory is configured to store a computer program, and the processor is configured to call and run the computer program stored in the memory to perform the method of the third aspect described above or various implementation modes of the third aspect.

In a tenth aspect, there is provided an apparatus configured to implement the method in any one of the first to third aspects or various implementations thereof.

Specifically, the apparatus includes a processor configured to call and run a computer program from a memory to enable a device in which the apparatus is installed to perform the method in any one of the first to third aspects or various implementation modes thereof.

In an eleventh aspect, there is provided a computer readable storage medium configured to store a computer program that enables a computer to perform the method in any one of the first to third aspects or various implementations thereof.

In a twelfth aspect, there is provided a computer program product including computer program instructions that enable a computer to perform the method in any one of the first to third aspects or various implementations thereof.

In a thirteenth aspect, there is provided a computer program, which, when being run on a computer, enables the computer to perform the method in any one of the first to third aspects or various implementations thereof.

According to a technical solution of the first aspect, in a case that duplication transmission of a first bearer is deactivated, a terminal device may determine an RLC entity for transmitting a PDCP PDU according to cell groups corresponding to a primary RLC entity and a secondary RLC entity among at least three RLC entities configured for the first bearer, and/or determine an MAC entity to which PDCP data volume pending for transmission is mapped.

According to a technical solution of the second aspect, in a case that duplication transmission of a first bearer is deactivated, a terminal device may determine cell groups corresponding to a primary RLC entity and a secondary RLC entity among at least three RLC entities configured for the first bearer based on indication information for the first bearer sent by a network device, and further determine an RLC entity for transmitting a PDCP PDU, and/or, determine an MAC entity to which PDCP data volume pending for transmission is mapped.

According to a technical solution of the third aspect, in a case that duplication transmission of a first bearer is deactivated and there is a secondary RLC entity among at least three RLC entities configured for the first bearer, a terminal device determines an RLC entity for transmitting a PDCP PDU.

BRIEF DESCRIPTION OF DRAWINGS

FIG. 11 is another schematic flow chart of determining a mode for mapping PDCP data volume provided according to an implementation of the present disclosure.

FIG. 12 is a schematic flow chart of another wireless communication method provided according to an implementation of the present disclosure.

DETAILED DESCRIPTION

Technical solutions in implementations of the present disclosure will be described below with reference to the drawings in the implementations of the present disclosure. It is apparent that the implementations described are just some of the implementations of the present disclosure, but not all of the implementations of the present disclosure. According to the implementations of the present disclosure, all other implementations achieved by a person of ordinary skill in the art without paying an inventive effort are within the protection scope of the present disclosure.

The implementations of the present disclosure may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS), a Long Term Evolution (LTE) system, an Advanced Long Term Evolution (LTE-A) system, a New Radio (NR) system, an evolution system of an NR system, an LTE-based access to unlicensed spectrum (LTE-U) system, an NR-based access to unlicensed spectrum (NR-U) system, a Universal Mobile Telecommunications System (UMTS), Wireless Local Area Networks (WLAN), Wireless Fidelity (WiFi), a next generation communication system or other communication systems.

Generally speaking, traditional communication systems support a limited quantity of connections and are easy to implement. However, with the development of communication technology, mobile communication systems will not only support traditional communication, but also support, for example, device to device (D2D) communication, machine to machine (M2M) communication, machine type communication (MTC), vehicle to vehicle (V2V) communication, and the implementations of the present disclosure may also be applied to these communication systems.

Optionally, a communication system in the implementations of the present disclosure may be applied to a carrier aggregation (CA) scenario, a dual connectivity (DC) scenario, or a standalone (SA) networking scenario.

Implementations of the present disclosure do not limit frequency spectrums applied. For example, implementations of the present disclosure may be applied to both licensed spectrum and unlicensed spectrum.

Figure 1:
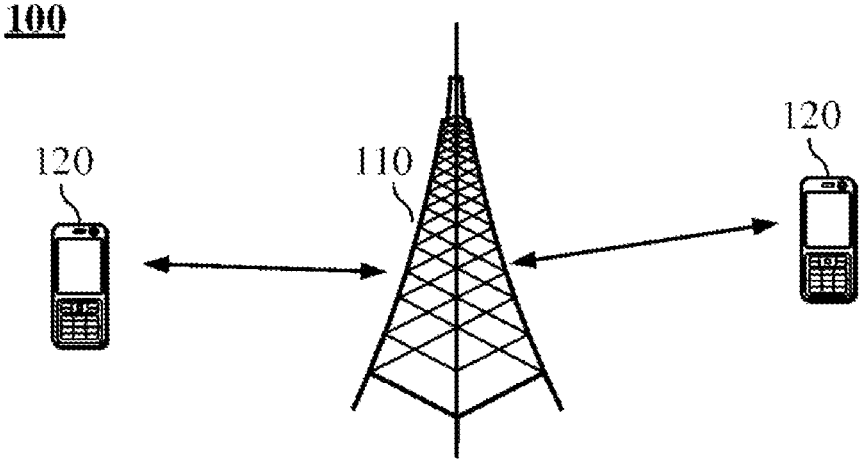
FIG. 1 is a schematic diagram of an architecture of a communication system provided according to an implementation of the present disclosure.

Illustratively, a communication system 100 applied in an implementation of the present disclosure is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area.

FIG. 1 illustrates one network device and two terminal devices. Optionally, the communication system 100 may include multiple network devices, and other numbers of terminal devices may be included within the coverage range of each network device, which are not limited in the implementations of the present disclosure.

Optionally, the communication system 100 may include other network entities, such as a network controller and a mobile management entity, which is not limited in the implementations of the present disclosure.

It should be understood that a device with a communication function in a network/system in the implementations of the present disclosure may be referred to as a communication device. Taking the communication system 100 shown in FIG. 1 as an example, communication devices may include a network device 110 and terminal devices 120 which have communication functions, and the network device 110 and the terminal devices 120 may be the specific devices described above, and will not be described repeatedly herein. The communication devices may also include other devices in the communication system 100, such as network controllers and mobile management entities and other network entities, which are not limited in the implementations of the present disclosure.

It should be understood that the terms "system" and "network" are often used interchangeably herein. The term "and/or" herein describes an association relation between associated objects only, indicating that there may be three relations, for example, A and/or B may indicate three cases: A alone, both A and B, and B alone. In addition, the symbol "I" herein generally indicates that there is a "or" relationship between the associated objects before and after "/".

Implementations of the present disclosure describe various implementations in combination with a terminal device and a network device, wherein the terminal device may also be referred to a User Equipment (UE), an access terminal, a subscriber unit, a subscriber station, a mobile station, a mobile platform, a remote station, a remote terminal, a mobile device, a user terminal, a terminal, a wireless communication device, a user agent, or a user apparatus, etc. The terminal device may be a STATION (ST) in WLAN, a cellular phone, a cordless phone, a Session Initiation Protocol (SIP) phone, a Wireless Local Loop (WLL) station, a Personal Digital Assistant (PDA) device, a handheld device with a wireless communication function, a computing device or other processing device connected to a wireless modem, a vehicle-mounted device, a wearable device, and a next generation communication system, such as, a terminal device in an NR network, or a terminal device in a future evolving Public Land Mobile Network (PLMN), etc.

By way of example but not limitation, in an implementation of the present disclosure, the terminal device may also be a wearable device. A wearable device may also be referred to a wearable intelligent device, which is a general term of wearable devices developed by intelligent design of daily wear using wearing technology, e.g., glasses, gloves, watches, clothing, shoes, etc. A wearable device is a portable device that is worn directly on a body or integrated into the clothes or accessories of a user. Wearable devices are not only hardware devices, but also realize powerful functions through software support, data interaction and cloud interaction. Generalized wearable smart devices include devices that are full functioned, large sized, and may realize complete or partial functions without relying on smart phones, such as smart watches or smart glasses, etc., and include devices that only focus on a certain kind of application and need to be used in conjunction with other devices such as smart phones, such as various smart bracelets and smart jewelry for monitoring physical signs.

The network device may be a network device for communicating with a mobile device, or may be an Access Point (AP) in a WLAN, or a Base Transceiver Station (BTS) in GSM or CDMA, or may be a NodeB (NB) in WCDMA, or an Evolutional Node B (eNB or eNodeB) in LTE, or a relay station or an access point, or a vehicle-mounted device, a wearable device, a network device or a base station (gNB) in an NR network, or a network device in a future evolved PLMN network.

In the implementations of the present disclosure, a network device may provide a service for a cell, and a terminal device communicates with the network device through a transmission resource (e.g., a frequency domain resource or a spectrum resource) used by the cell, which may be a cell corresponding to the network device (e.g., a base station). A cell may belong to a macro base station, or a base station corresponding to a Small cell. The Small cell here may include: a Metro cell, a Micro cell, a Pico cell, a Femto cell, etc. These Small cells have characteristics of small coverage range and low transmission power, and are suitable for providing high-speed data transmission services.

Figure 2:
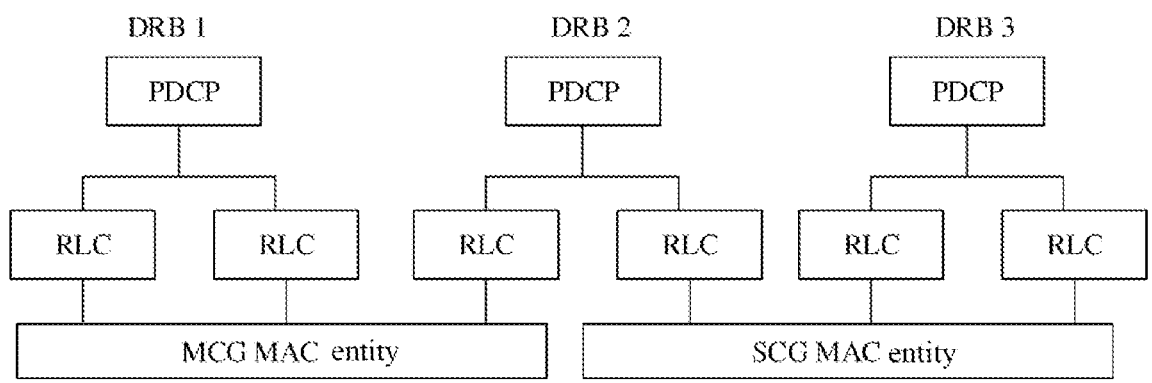
FIG. 2 is a schematic diagram of an architecture of a duplication transmission mode.

With reference to FIG. 2, duplication transmission method in a Dual Connection (DC) or Carrier Aggregation (CA) scenario in an implementation of the present disclosure is briefly introduced.

In a Dual Connection (DC) scenario, multiple network nodes (cell group (CG)) may serve a terminal device, and duplication transmission may be carried out between the cell groups and the terminal device. It should be understood that in the implementations of the present disclosure, a CG may be equivalent to a network node, or a network device, etc.

Specifically, in a DC scenario, a protocol architecture of a duplication transmission mode may be shown in DRB 2 in FIG. 2. A Packet Data Convergence Protocol (PDCP) is located in a CG (for example, a Master CG (MCG) or a Secondary CG (SCG), which may also be called a Master Node (MN) or a Secondary Node (SN)). The PDCP duplicates a PDCP PDU into two same copies, for example, one is a PDCP PDU and the other is a duplicated PDCP PDU. The two PDCP PDUs pass through Radio Link Control (RLC) layers and Media Access Control (MAC) layers of different CGs, and reach a corresponding MAC layer and RLC layer of a terminal device (downlink) or a base station (uplink) through an air interface respectively, and finally are converged at a PDCP layer. When the PDCP layer detects that the two PDCP PDUs are the same duplicated version, one of the two PDCP PDUs may be discarded, and the other PDCP PDU may be submitted to a higher layer.

In the implementations of the present disclosure, two PDCP PDUs are transmitted through different CGs, a purpose of frequency diversity gain may be achieved, and thus reliability of data transmission can be improved.

It should be understood that for a bearer configured with duplication transmission (for example, a Data Radio Bearer (DRB) or a Signaling Radio Bearer (SRB)), duplication transmission function of a bearer may be dynamically activated or deactivated through a MAC Control Element (CE).

In addition, in an implementation of the present disclosure, an entity used for transmitting replicated data in a lower layer of a PDCP may be called a leg or path, or may be replaced by a Logical Channel (LCH), that is, an RLC entity may be replaced by a leg or a Logical Channel. Accordingly, an RLC entity identifier may be replaced by an LCH identifier or a leg identifier.

In a CA scenario, a protocol architecture of a duplication transmission mode may be as shown in DRB 1 or DRB 3 in FIG. 2. The duplication transmission mode adopts a protocol architecture of CA. Specifically, when duplication transmission is activated, data (PDU and replicated data of PDU) generated by a PDCP layer are transmitted to two different RLC entities, which are mapped to different physical layer carriers through the same MAC layer entity. It should be understood that in the implementations of the present disclosure, data (PDU and replicated data of PDU) generated by a PDCP layer is mapped to different physical layer carriers through two different RLC entities respectively, thus a purpose of frequency diversity gain can be achieved, and further reliability of data transmission can be improved.

In a case that duplication transmission is deactivated and a condition for split transmission is met, a terminal device may also use two RLC entities corresponding to the bearer to transmit split data, that is, transmit different data through the two RLC entities. The condition for split transmission may be that PDCP data volume and RLC data volume of the two RLC entities pending for transmission are greater than or equal to a preset threshold.

The above is a duplication transmission mode in which only two RLC entities are supported. In R16, it is a duplication transmission mode in which at least two RLC entities are supported. Specifically, in a case that duplication transmission is activated, an architecture of CA, an architecture of DC, or an architecture combining DC and CA may be adopted for duplication transmission. Similarly, data (PDU and duplicate data of PDU) generated by a PDCP layer are mapped to a lower layer through at least two different RLC entities for transmission, so as to achieve a purpose of frequency diversity gain and further improve reliability of data transmission.

However, in a case that duplication transmission is deactivated, it may fall back to split transmission. When falling back to split transmission, a secondary leg for split transmission may be indicated by Radio Resource Control (RRC). However, at this time, whether a primary leg and a secondary leg may belong to the same CG, and how to perform transmission if the primary leg and the secondary leg belong to the same CG, is an urgent problem to be solved. The following describes in detail a split transmission solution designed for the above technical problems in the present disclosure.

Figure 3:
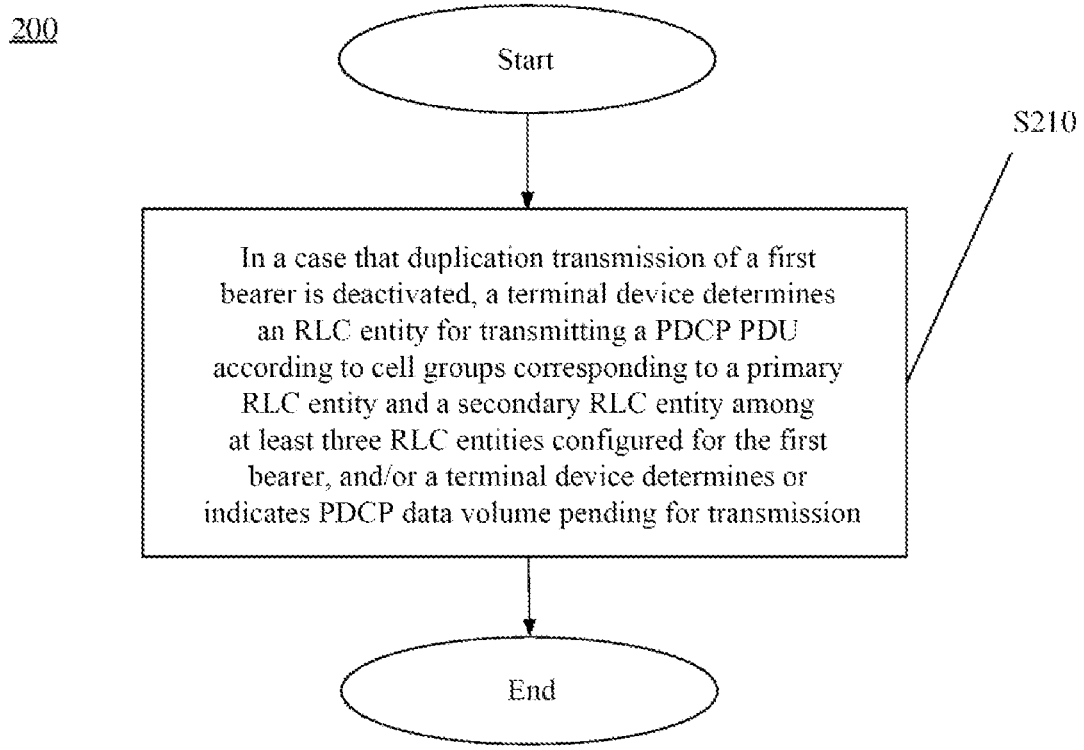
FIG. 3 is a schematic flow chart of a wireless communication method provided according to an implementation of the present disclosure.

FIG. 3 is a schematic flow chart of a wireless communication method 200 provided according to an implementation of the present disclosure. The method 200 may be performed by a terminal device in a communication system shown in FIG. 1. As shown in FIG. 3, the method 200 may include at least part of the following content.

In S210, in a case that duplication transmission of a first bearer is deactivated, a terminal device determines an RLC entity for transmitting a PDCP PDU according to cell groups corresponding to a primary RLC entity and a secondary RLC entity among at least three RLC entities configured for the first bearer, and/or the terminal device determines or indicates PDCP data volume pending for transmission.

Optionally, in S210, in a case that the duplication transmission of the first bearer is deactivated, the terminal device determines or indicates PDCP data volume pending for transmission according to the cell groups corresponding to the primary RLC entity and the secondary RLC entity among the at least three RLC entities configured for the first bearer.

Further, in S210, in a case that the duplication transmission of the first bearer is deactivated, the terminal device determines or indicates an MAC entity to which the PDCP data volume pending for transmission is mapped according to the cell groups corresponding to the primary RLC entity and the secondary RLC entity among the at least three RLC entities configured for the first bearer.

Specifically, for duplication transmission under a scenario of combining DC and CA, a radio bearer may be configured with at least three RLC entities, and at least one RLC entity is configured corresponding to each Cell Group (CG). The cell groups may be an MCG and an SCG, for example.

In an implementation of the present disclosure, in a case that duplication transmission of a first bearer is deactivated, it may fall back to split transmission, and a terminal device determines whether to perform split transmission or determine an RLC entity for transmitting a PDCP PDU according to cell groups corresponding to a primary RLC entity and a secondary RLC entity among at least three RLC entities configured for the first bearer. The terminal device may also determine an MAC entity to which PDCP data volume pending for transmission is mapped according to cell groups corresponding to a primary RLC entity and a secondary RLC entity among at least three RLC entities configured for the first bearer.

Optionally, the at least three RLC entities may include: one or more primary RLC entities or primary legs, one or more secondary RLC entities or secondary legs.

In addition, the at least three RLC entities may also include one or more other RLC entities.

Optionally, in an implementation of the present disclosure, a transmitting PDCP entity may take the following contents as PDCP data volume pending for transmission: a PDCP Service Data Unit (SDU) in which a PDCP data PDU is not constructed; a PDCP data PDU not transmitted to a lower layer; a PDCP control PDU; a PDCP SDU to be retransmitted for a DRB in a Acknowledged Mode (AM); a PDCP data PDU to be retransmitted for a DRB in a AM.

Optionally, the first bearer may be a DRB or an SRB.

Optionally, in an implementation of the present disclosure, a terminal device may receive configuration information of a network device for the first bearer, and determine the primary RLC entity and the secondary RLC entity among the at least three RLC entities according to the configuration information, and/or determine cell groups corresponding to the primary RLC entity and the secondary RLC entity among the at least three RLC entities.

Optionally, the configuration information may include at least one piece of the following information: an identifier of the first bearer; an RLC entity identifier, such as an identifier of at least one RLC entity among the at least three RLC entities; an LCH identifier; a Cell group identifier, such as identifiers of at least two cell groups configured for the first bearer, wherein each of the at least two cell groups is configured with at least one RLC entity, or a corresponding or mapped cell group identifier is configured for an RLC entity when the RLC entity is configured; the number of RLC entities, such as 3 or 4, or more; a threshold for uplink data split transmission, for example, a uplink split data threshold (ul-DataSplitThreshold) and/or a uplink split data threshold of Rel-16 (ul-DataSplitThreshold-r16); a MAC entity identifier; information of a primary RLC entity, including at least one of an RLC entity identifier and a CG identifier; information of a secondary RLC entity, including at least one of an RLC entity identifier and a CG identifier; and indication information for indicating whether the primary RLC entity and the secondary RLC entity belong to the same cell group.

It should be noted that in the configuration information, the indication information may explicitly indicate whether the primary RLC entity and the secondary RLC entity belong to the same cell group. For example, it is indicated by 1 bit, wherein "0" indicates that the primary RLC entity and the secondary RLC entity belong to the same cell group, and "1" indicates that the primary RLC entity and the secondary RLC entity do not belong to the same cell group. In addition, in the configuration information, the indication information may implicitly indicate whether the primary RLC entity and the secondary RLC entity belong to the same cell group by configuration. For example, when configuring a primary/secondary RLC entity, a CG identifier corresponding to an RLC entity is indicated. For example, as long as a secondary RLC entity is configured, a primary RLC entity and the secondary RLC entity are used for split transmission. In another example, as long as a secondary RLC entity is configured and the secondary RLC entity and a primary RLC entity are not of the same MAC entity, split transmission is performed by the primary RLC entity and the secondary RLC entity.

Optionally, in an implementation of the present disclosure, information of an RLC entity may be an identifier of an RLC entity, or may be an identification bit for identifying a primary RLC entity or a secondary RLC entity.

Optionally, the configuration information for the first bearer is carried in at least one of the following signaling: Media access control element (MAC CE), Downlink Control Information (DCI), and Radio Resource Control (RRC) signaling.

Figure 4:
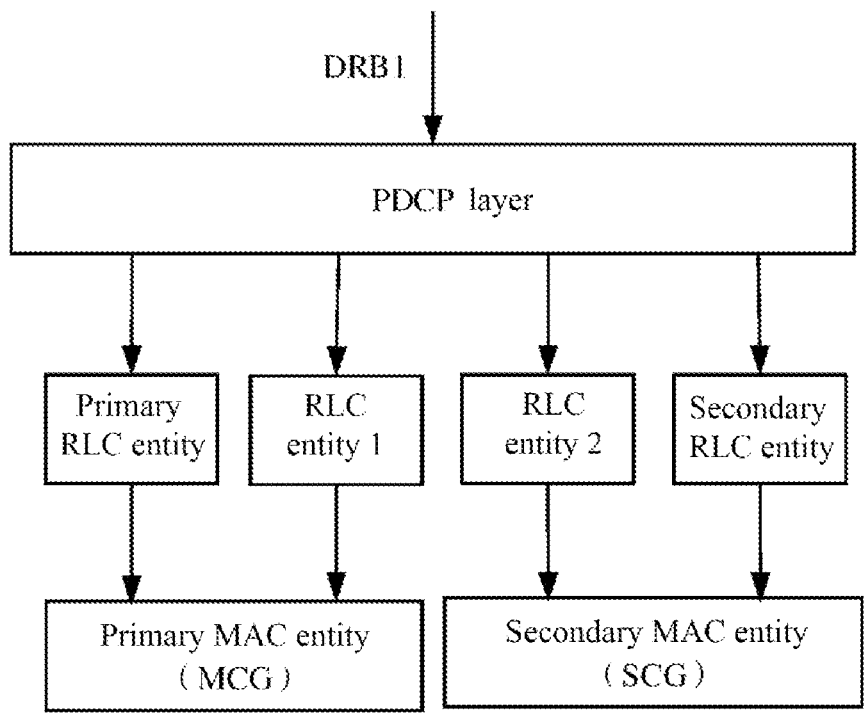
FIG. 4 is a schematic diagram of a primary RLC entity and a secondary RLC entity provided according to an implementation of the present disclosure.
Figure 5:
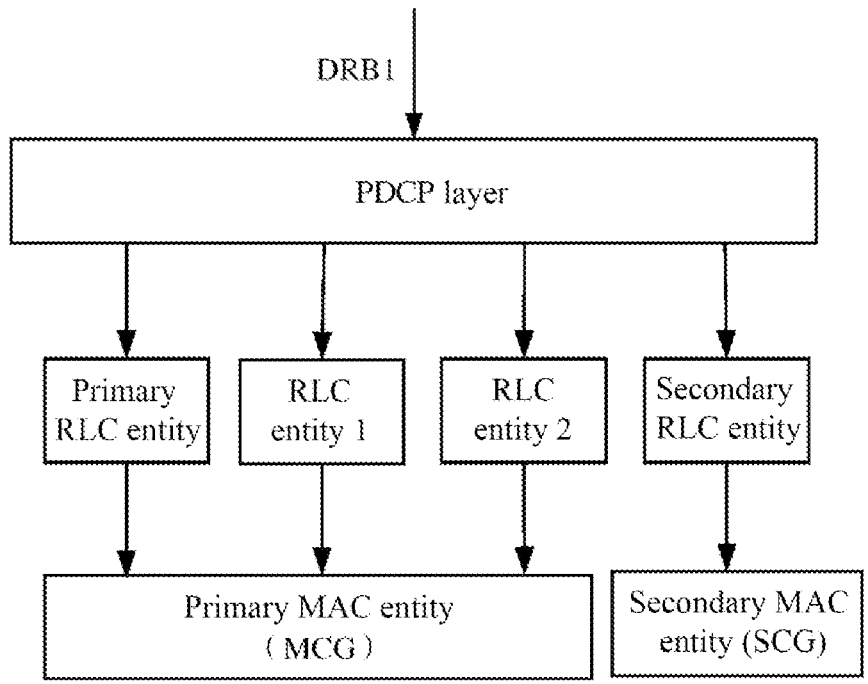
FIG. 5 is a schematic diagram of another primary RLC entity and another secondary RLC entity provided according to an implementation of the present disclosure.
Figure 6:
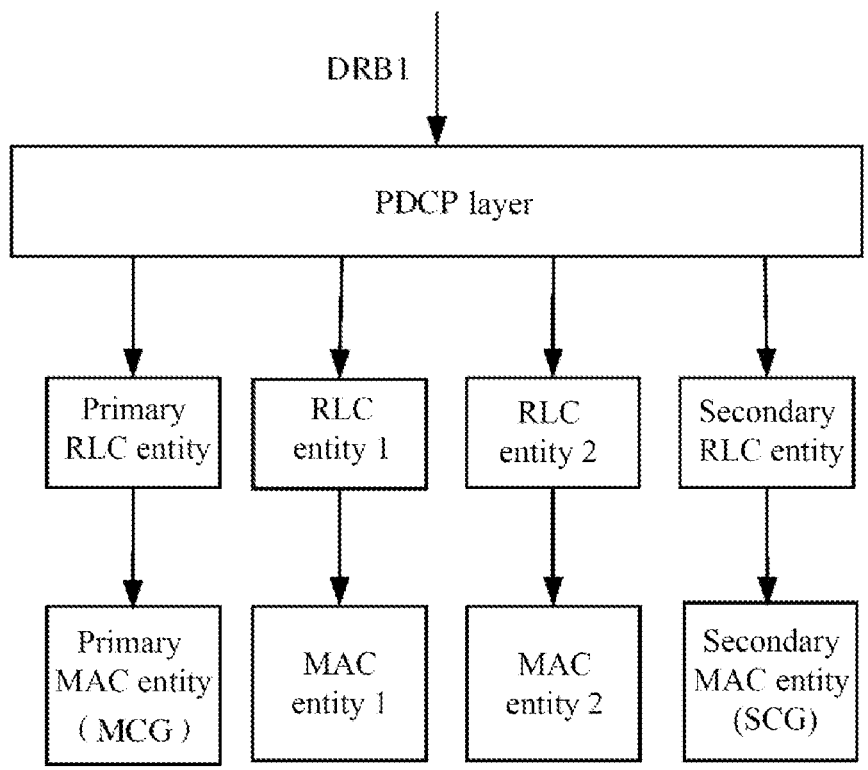
FIG. 6 is a schematic diagram of another primary RLC entity and another secondary RLC entity provided according to an implementation of the present disclosure.
Figure 7:
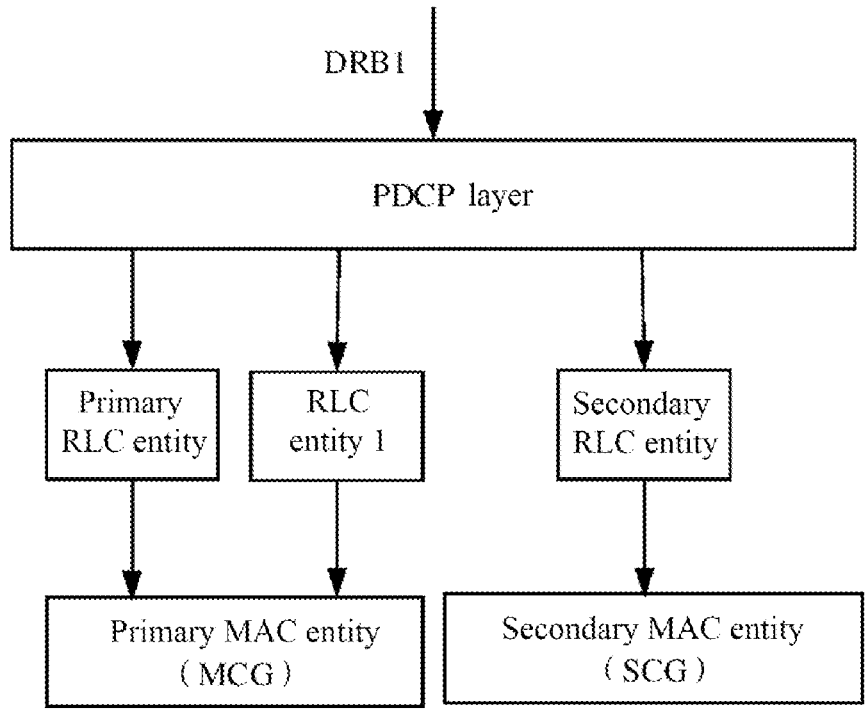
FIG. 7 is a schematic diagram of yet another primary RLC entity and another secondary RLC entity provided according to an implementation of the present disclosure.

At least three RLC entities configured for the first bearer will be specifically described with reference to examples shown in FIGS. 4 to 7. As shown in FIG. 4, the first bearer is DRB 1, which is configured with four RLC entities, namely, a primary RLC entity, RLC entity 1, RLC entity 2, and a secondary RLC entity. The primary RLC entity and the RLC entity 1 correspond to a primary MAC entity, which corresponds to an MCG, while the RLC entity 2 and the secondary RLC entity correspond to a secondary MAC entity, which corresponds to an SCG. As shown in FIG. 5, the first bearer is DRB 1, which is configured with four RLC entities, namely a primary RLC entity, RLC entity 1, RLC entity 2, and a secondary RLC entity. The primary RLC entity, the RLC entity 1, and the RLC entity 2 correspond to a primary MAC entity, which corresponds to an MCG, and the secondary RLC entity corresponds to a secondary MAC entity, which corresponds to an SCG. As shown in FIG. 6, the first bearer is DRB 1, which is configured with four RLC entities, namely, a primary RLC entity, RLC entity 1, RLC entity 2, and a secondary RLC entity. The primary RLC entity corresponds to a primary MAC entity, which corresponds to an MCG, the RLC entity 1 corresponds to MAC entity 1, the RLC entity 2 corresponds to MAC entity 2, and the secondary RLC entity corresponds to a secondary MAC entity, which corresponds to an SCG. As shown in FIG. 7, the first bearer is DRB 1, which is configured with three RLC entities, namely a primary RLC entity, RLC entity 1, and a secondary RLC entity. The primary RLC entity and the RLC entity 1 correspond to a primary MAC entity, which corresponds to an MCG, and the secondary RLC entity corresponds to a secondary MAC entity, which corresponds to an SCG.

It should be noted that the FIGS. 4 to 7 are only examples, and do not limit the number of RLC entities and MAC entities in an implementation of the present disclosure. In addition, RLC entities and MAC entities may have a one-to-one relationship or a many-to-one relationship, which is not limited by an implementation of the present disclosure.

Optionally, in an implementation of the present disclosure, the terminal device may receive indication information of a network device for the first bearer, and determine cell groups corresponding to the primary RLC entity and the secondary RLC entity among the at least three RLC entities according to the indication information, or determine a cell group corresponding to an RLC entity used for split transmission among the at least three RLC entities.

For example, the indication information is used to indicate that an RLC entity corresponding to a cell group different from a cell group corresponding to the primary RLC entity in at least two cell groups configured for the first bearer is a secondary RLC entity.

For another example, the indication information is used to indicate that in an RLC entity corresponding to a cell group which is the same as a cell group corresponding to the primary RLC entity is at least two cell groups configured for the first bearer a secondary RLC entity.

For another example, the indication information is used to indicate that only an RLC entity corresponding to a cell group different from a cell group corresponding to the primary RLC entity in at least two cell groups configured for the first bearer is a secondary RLC entity.

For another example, the indication information is used to indicate that only an RLC entity corresponding to a cell group which is the same as a cell group corresponding to the primary RLC entity in at least two cell groups configured for the first bearer is a secondary RLC entity.

For another example, the indication information is used to indicate that an RLC entity corresponding to a cell group which is the same as or different from a cell group corresponding to the primary RLC entity in at least two cell groups configured for the first bearer is a secondary RLC entity.

Optionally, in an implementation of the present disclosure, the indication information is used to indicate an RLC entity corresponding to split transmission among the at least three RLC entities, or to indicate a secondary RLC entity corresponding to split transmission among the at least three RLC entities, or to indicate whether an RLC entity among the at least three RLC entities meets split transmission.

For example, a secondary RLC entity configured for the first bearer corresponds to a CG different from a CG corresponding to a primary RLC entity, and a secondary RLC entity indicated by the indication information corresponds to the same CG as a primary RLC entity, then split transmission cannot be performed.

For another example, a secondary RLC entity configured for the first bearer corresponds to the same CG as a primary RLC entity, and a secondary RLC entity indicated by the indication information corresponds to a CG different from a CG corresponding to a primary RLC entity, then split transmission cannot be performed.

In another example, a secondary RLC entity configured for the first bearer corresponds to a CG different from a CG corresponding to a primary RLC entity, and a secondary RLC entity indicated by the indication information corresponds to a CG different from a CG corresponding to a primary RLC entity, then split transmission can be performed.

For another example, a secondary RLC entity configured for the first bearer corresponds to the same CG as a primary RLC entity, and a secondary RLC entity indicated by the indication information corresponds to the same CG as a primary RLC entity, then split transmission can be performed.

In an implementation of the present disclosure, the indication information may be specifically indicated in the following manner: if first signaling carries the indication information, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is not carried in first signaling or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if first signaling carries the indication information or a value of the indication information is a first value, the indication information is used to indicate that only an RLC entity corresponding to a cell group different from a cell group corresponding to the primary RLC entity in at least two cell groups configured for the first bearer is a secondary RLC entity; or, if first signaling carries the indication information, or a value of the indication information is a first value, the indication information is used to indicate that only an RLC entity corresponding to a cell group which is the same as a cell group corresponding to the primary RLC entity in at least two cell groups configured for the first bearer is a secondary RLC entity; or, if the indication information is not carried in first signaling, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

In an implementation of the present disclosure, the indication information may be specifically indicated in the following manner: if the indication information is not carried in first signaling, or a value of the indication information is a first value, the indication information is used to indicate that an RLC entity corresponding to a cell group different from a cell group corresponding to the primary RLC entity in at least two cell groups configured for the first bearer is a secondary RLC entity; or, if first signaling carries the indication information or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if the indication information is not carried in first signaling, or a value of the indication information is a first value, the indication information is used to indicate that only an RLC entity corresponding to a cell group different from a cell group corresponding to the primary RLC entity in at least two cell groups configured for the first bearer is a secondary RLC entity; or, if the indication information is not carried in first signaling, or a value of the indication information is a first value, the indication information is used to indicate that only one RLC entity corresponding to a cell group which is the same as a cell group corresponding to the primary RLC entity in at least two cell groups configured for the first bearer is a secondary RLC entity; or, if first signaling carries the indication information, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

Optionally, the indication information occupies a resource of 1 bit, wherein the first value is 1 and the second value is 0, or the first value is 0 and the second value is 1.

Optionally, the first signaling is at least one of the following signaling: MAC CE, DCI, and RRC signaling.

Optionally, the indication information is configured through configuration information for the first bearer, or configured for a terminal device, or configured for a cell group.

It should be noted that the indication information may not be limited to be for the first bearer, for example, the indication information may be for the terminal device, or the indication information may be for a MAC entity or a cell group.

Figure 8:
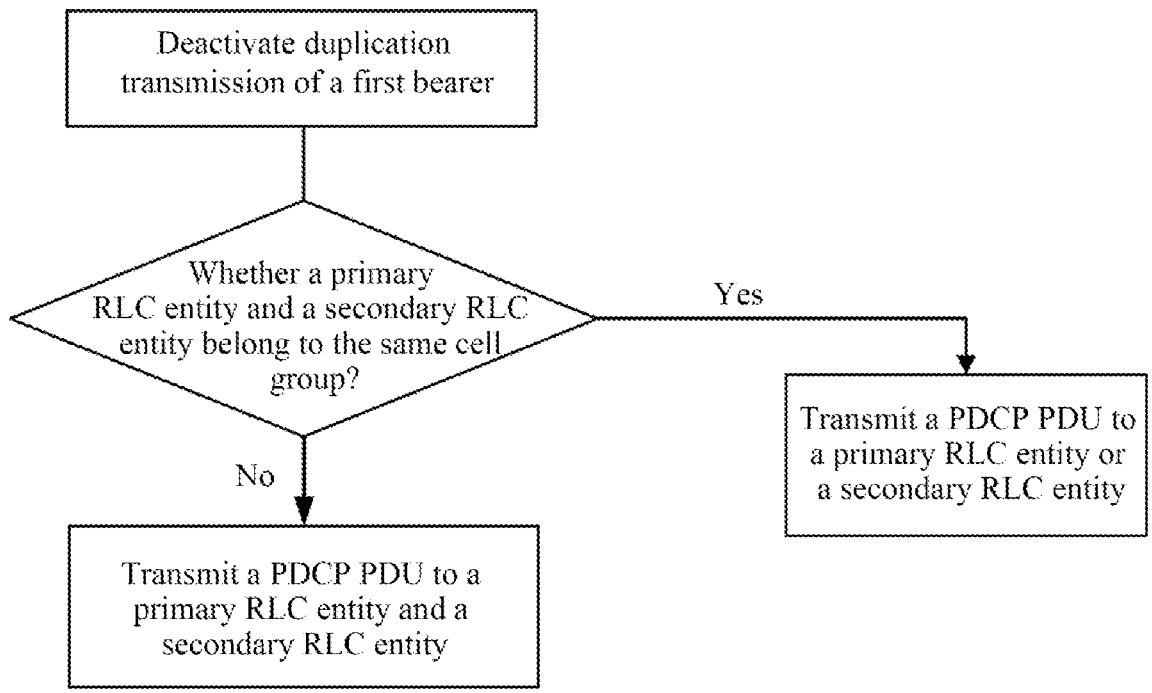
FIG. 8 is a schematic flow chart of determining a PDCP PDU transmission mode provided according to an implementation of the present disclosure.
Figure 9:
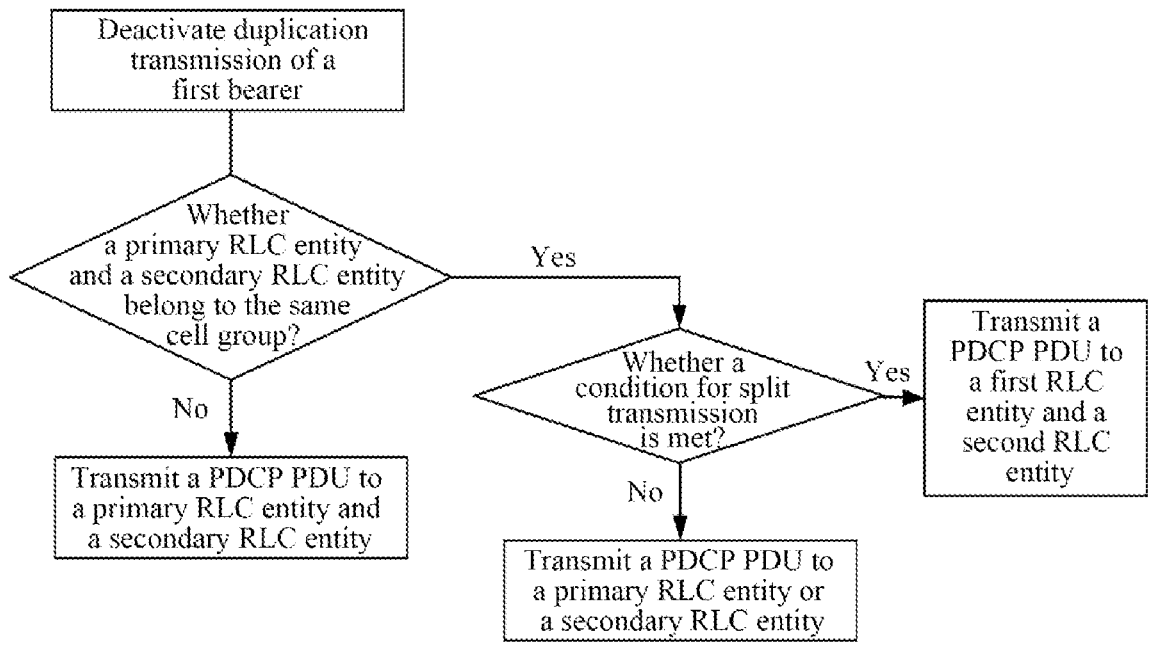
FIG. 9 is another schematic flow chart of determining a PDCP PDU transmission mode provided according to an implementation of the present disclosure.

Optionally, in the implementation of the present disclosure, as shown in FIGS. 8 and 9, in the above act S210, the terminal device determines an RLC entity for transmitting the PDCP PDU according to the cell groups corresponding to the primary RLC entity and the secondary RLC entity among the at least three RLC entities configured for the first bearer, which may specifically include at least one of the following: if the primary RLC entity and the secondary RLC entity correspond to different cell groups, the terminal device determines to use the primary RLC entity and the secondary RLC entity to transmit the PDCP PDU through split transmission, or the terminal device transmits the PDCP PDU to the primary RLC entity and the secondary RLC entity; if the primary RLC entity and the secondary RLC entity correspond to the same cell group, the terminal device determines to use the primary RLC entity or the secondary RLC entity to transmit the PDCP PDU, or the terminal device transmits the PDCP PDU to the primary RLC entity or the secondary RLC entity; if the primary RLC entity and the secondary RLC entity correspond to the same cell group, the terminal device determines to use a first RLC entity and a second RLC entity to transmit the PDCP PDU through split transmission, or the terminal device transmits the PDCP PDU to the first RLC entity and the second RLC entity; if the primary RLC entity and the secondary RLC entity correspond to the same cell group and a condition for split transmission is met, the terminal device determines to use a first RLC entity and a second RLC entity to transmit the PDCP PDU through split transmission, or the terminal device transmits the PDCP PDU to a first RLC entity and a second RLC entity; if the primary RLC entity and the secondary RLC entity correspond to the same cell group and a condition for split transmission is not met, the terminal device determines to use the primary RLC entity or the secondary RLC entity to transmit the PDCP PDU, or the terminal device transmits the PDCP PDU to the primary RLC entity or the secondary RLC entity; if a cell group which is the same as a cell group corresponding to the primary RLC entity in at least two cell groups configured for the first bearer only corresponds to one RLC entity and the one RLC entity is the primary RLC entity, the terminal device determines to use the primary RLC entity to transmit the PDCP PDU, or the terminal device transmits the PDCP PDU to the primary RLC entity; if there is only one RLC entity in a MAC entity where the primary RLC entity is located, the terminal device determines that an RLC entity corresponding to a cell group different from a cell group corresponding to the primary RLC entity is the secondary RLC entity, and the terminal device determines to use the primary RLC entity and the secondary RLC entity to transmit the PDCP PDU through split transmission, or the terminal device transmits the PDCP PDU to the primary RLC entity and the secondary RLC entity; if there are multiple RLC entities in a MAC entity where the primary RLC entity is located, and there is an RLC entity in a MAC entity different from the MAC entity where the primary RLC entity is located, the terminal device determines that an RLC entity corresponding to a cell group different from a cell group corresponding to the primary RLC entity is the secondary RLC entity, and the terminal device determines to use the primary RLC entity and the secondary RLC entity to transmit the PDCP PDU through split transmission, or the terminal device transmits the PDCP PDU to the primary RLC entity and the secondary RLC entity.

It should be noted that in a case that a terminal device receives indication information for the first bearer sent by a network device, or in a case that a terminal device receives indication information for the first bearer sent by a network device and it is indicated that the primary RLC entity and the secondary RLC entity correspond to one CG, if a cell group which is the same as a cell group corresponding to the primary RLC entity in at least two cell groups configured for the first bearer only corresponds to one RLC entity, and the one RLC entity is the primary RLC entity, the terminal device determines to use the primary RLC entity to transmit a PDCP PDU, or the terminal device transmits a PDCP PDU to the primary RLC entity.

Figure 10:
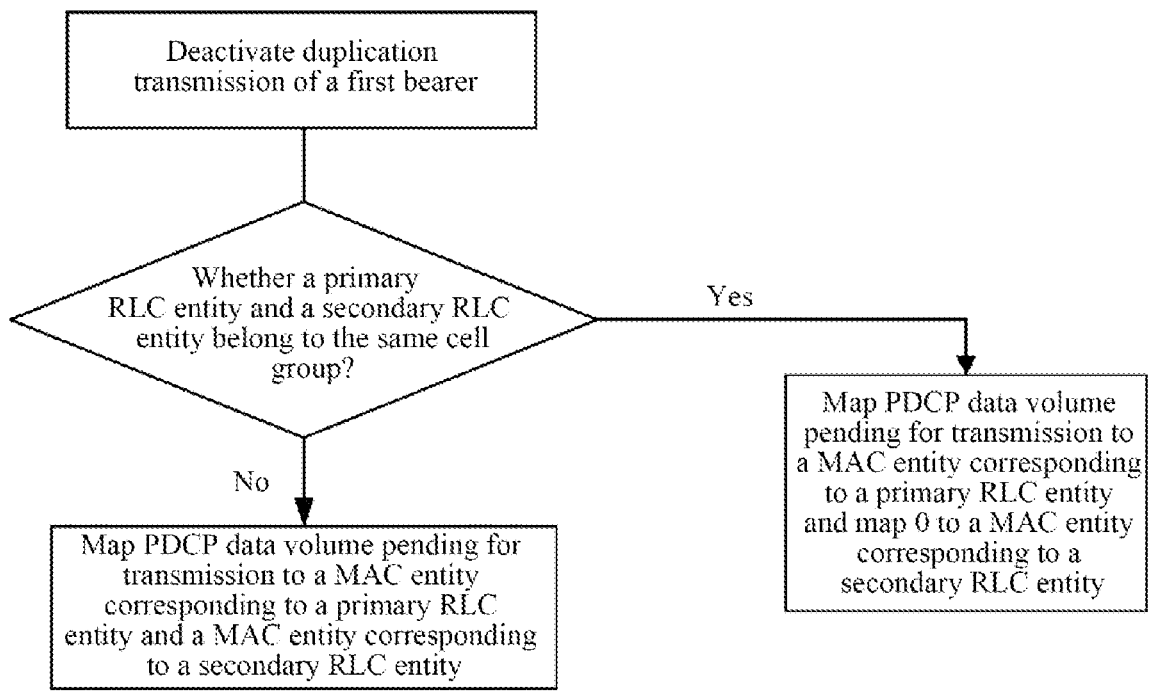
FIG. 10 is a schematic flow chart of determining a mode for mapping PDCP data volume provided according to an implementation of the present disclosure.

Optionally, in an implementation of the present disclosure, as shown in FIG. 10 and FIG. 11, in the above act S210, the terminal device determines the MAC entity to which the PDCP data volume pending for transmission is mapped according to the cell groups corresponding to the primary RLC entity and the secondary RLC entity among the at least three RLC entities configured for the first bearer, including at least one of the following: if the primary RLC entity and the secondary RLC entity correspond to different cell groups, the terminal device maps the PDCP data volume pending for transmission to a MAC entity corresponding to the primary RLC entity and a MAC entity corresponding to the secondary RLC entity; if the primary RLC entity and the secondary RLC entity correspond to the same cell group, the terminal device maps the PDCP data volume pending for transmission to a MAC entity corresponding to the primary RLC entity; if the primary RLC entity and the secondary RLC entity correspond to the same cell group, the terminal device maps the PDCP data volume pending for transmission to a MAC entity corresponding to the primary RLC entity and maps 0 to a MAC entity corresponding to the secondary RLC entity; if the primary RLC entity and the secondary RLC entity correspond to the same cell group, the terminal device maps the PDCP data volume pending for transmission to a MAC entity corresponding to a first RLC entity and a MAC entity corresponding to a second RLC entity; if the primary RLC entity and the secondary RLC entity correspond to the same cell group and a condition for split transmission is met, the terminal device maps the PDCP data volume pending for transmission to a MAC entity corresponding to a first RLC entity and a MAC entity corresponding to a second RLC entity; if the primary RLC entity and the secondary RLC entity correspond to the same cell group, the terminal device maps the PDCP data volume pending for transmission to a MAC entity corresponding to the primary RLC entity and a MAC entity corresponding to the secondary RLC entity; if the primary RLC entity and the secondary RLC entity correspond to the same cell group and a condition for split transmission is met, the terminal device maps the PDCP data volume pending for transmission to a MAC entity corresponding to the primary RLC entity and a MAC entity corresponding to the secondary RLC entity; if the primary RLC entity and the secondary RLC entity correspond to the same cell group and a condition for split transmission is not met, the terminal device maps the PDCP data volume pending for transmission to a MAC entity corresponding to the primary RLC entity; if the primary RLC entity and the secondary RLC entity correspond to the same cell group and a condition for split transmission is not met, the terminal device maps the PDCP data volume pending for transmission to a MAC entity corresponding to the primary RLC entity and maps 0 to a MAC entity corresponding to the secondary RLC entity; if a cell group which is the same as a cell group corresponding to the primary RLC entity in at least two cell groups configured for the first bearer only corresponds to one RLC entity, and the one RLC entity is the primary RLC entity, the terminal device determines to use the primary RLC entity to transmit a PDCP PDU, or the terminal device maps the PDCP data volume pending for transmission to a MAC entity corresponding to the primary RLC entity; if there is only one RLC entity in a MAC entity where the primary RLC entity is located, the terminal device determines that an RLC entity corresponding to a cell group different from a cell group corresponding to the primary RLC entity is the secondary RLC entity, and the terminal device maps the PDCP data volume pending for transmission to a MAC entity corresponding to the primary RLC entity and a MAC entity corresponding to the secondary RLC entity; if there are multiple RLC entities in a MAC entity where the primary RLC entity is located, and there is an RLC entity in a MAC entity different from the MAC entity where the primary RLC entity is located, the terminal device determines that an RLC entity corresponding to a cell group different from a cell group corresponding to the primary RLC entity is the secondary RLC entity, and the terminal device maps the PDCP data volume pending for transmission to a MAC entity corresponding to the primary RLC entity and a MAC entity corresponding to the secondary RLC entity.

It should be noted that in a case that a terminal device receives indication information for the first bearer sent by a network device, or in a case that a terminal device receives indication information for the first bearer sent by a network device and it is indicated that a primary RLC entity and a secondary RLC entity correspond to one CG, if a cell group which is the same as a cell group corresponding to the primary RLC entity in at least two cell groups configured for the first bearer only corresponds to one RLC entity, and the one RLC entity is the primary RLC entity, the terminal device determines to use the primary RLC entity to transmit a PDCP PDU, or the terminal device maps the PDCP data volume pending for transmission to a MAC entity corresponding to the primary RLC entity.

Optionally, in a specific implementation of the act S210, the first RLC entity and the second RLC entity correspond to different cell groups.

Optionally, the first RLC entity and the second RLC entity may met the following conditions: the first RLC entity is the primary RLC entity, and the second RLC entity is a specific RLC entity corresponding to a cell group different from a cell group corresponding to the first RLC entity; or, the first RLC entity is the secondary RLC entity, and the second RLC entity is a specific RLC entity corresponding to a cell group different from a cell group corresponding to the first RLC entity; or, the first RLC entity is the secondary RLC entity and the second RLC entity is the primary RLC entity; or, the first RLC entity is the primary RLC entity, and the second RLC entity is the secondary RLC entity.

Optionally, in a specific implementation of the act S210, the specific RLC entity is one of the following: any one RLC entity, an RLC entity with the smallest index identifier, an RLC entity with the largest index identifier, an RLC entity with the best channel quality, and an indicated RLC entity.

Optionally, in a specific implementation of the act S210, the condition for split transmission includes that the data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for transmission, a total amount of PDCP data volume and RLC data volume pending for initial transmission; in an RLC entity that had been activated and is configured for the first bearer for initial transmission of data, a total amount of PDCP data volume and RLC data volume pending for initial transmission; a total amount of PDCP data volume and RLC data volume pending for initial transmission in the primary RLC entity and the secondary RLC entity; a total amount of PDCP data volume and RLC data volume pending for transmission in the primary RLC entity and the secondary RLC entity.

Therefore, in an implementation of the present disclosure, in a case that duplication transmission of the first bearer is deactivated, according to cell groups corresponding to a primary RLC entity and a secondary RLC entity among at least three RLC entities configured for the first bearer, a terminal device may determine an RLC entity for transmitting a PDCP PDU, and/or determine a MAC entity to which PDCP data volume pending for transmission is mapped.

Further, when a primary RLC entity and a secondary RLC entity belong to the same cell group, split transmission is not used.

Or, when a primary RLC entity and a secondary RLC entity belong to the same cell group and a condition for split transmission is met, two RLC entities belonging to different cell groups are selected for split transmission. It may be ensured that there are more resources to transmit PDCP PDUs when data volume is large.

The wireless communication method according to an implementation of the present disclosure is described in detail above from a perspective of a terminal device in connection with FIG. 3 to FIG. 11. In the following, a wireless communication method according to another implementation of the present disclosure will be described in detail from another perspective of a terminal device in connection with FIG. 12. It should be understood that the description in FIG. 12 corresponds to the description of FIGS. 3 to 11, and a similar description may refer to the above description, which will not be repeated here to avoid repetition.

FIG. 12 is a schematic flow chart of a wireless communication method 300 provided according to an implementation of the present disclosure. The method 300 may be performed by a terminal device in the communication system shown in FIG. 1. As shown in FIG. 12, the method 300 may include at least part of following contents.

In S310, in a case that duplication transmission of a first bearer is deactivated, a terminal device determines cell groups corresponding to a primary RLC entity and a secondary RLC entity among at least three RLC entities configured for the first bearer according to indication information for the first bearer.

In S320, the terminal device determines an RLC entity for transmitting a PDCP PDU according to the cell groups corresponding to the primary RLC entity and the secondary RLC entity among the at least three RLC entities, and/or the terminal device determines or indicates PDCP data volume pending for transmission.

Optionally, in S320, the terminal device may determine or indicate the PDCP data volume pending for transmission according to the cell groups corresponding to the primary RLC entity and the secondary RLC entity among the at least three RLC entities.

Further, in S320, the terminal device may determine or indicate a MAC entity to which the PDCP data volume pending for transmission is mapped according to the cell groups corresponding to the primary RLC entity and the secondary RLC entity among the at least three RLC entities.

Optionally, in some implementations, the terminal device may also determine a primary RLC entity and a secondary RLC entity among at least three RLC entities configured for a first bearer according to indication information for the first bearer.

Optionally, in some implementations, the indication information is used to indicate an RLC entity corresponding to split transmission among the at least three RLC entities, or to indicate a secondary RLC entity corresponding to split transmission among the at least three RLC entities, or to indicate whether an RLC entity among the at least three RLC entities meets split transmission.

It should be noted that the indication information may not be limited to be for the first bearer, for example, the indication information may be for the terminal device, or the indication information may be for a MAC entity or a cell group.

Optionally, in some implementations, if first signaling carries the indication information, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is not carried in first signaling, or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if first signaling carries the indication information, or a value of the indication information is a first value, the indication information is used to indicate that only an RLC entity corresponding to a cell group different from a cell group corresponding to the primary RLC entity in at least two cell groups configured for the first bearer is a secondary RLC entity; or, if the indication information is not carried in first signaling, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

Optionally, in some implementations, if the indication information is not carried in first signaling, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is carried in first signaling or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if the indication information is not carried in first signaling, or a value of the indication information is a first value, the indication information is used to indicate that only an RLC entity corresponding to a cell group different from a cell group corresponding to the primary RLC entity in at least two cell groups configured for the first bearer is a secondary RLC entity; or, if first signaling carries the indication information, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

Optionally, the indication information occupies a resource of 1 bit, wherein the first value is 1 and the second value is 0, or the first value is 0 and the second value is 1.

Optionally, the first signaling is at least one of the following signaling: MAC CE, DCI, and RRC signaling.

Optionally, the indication information is configured through configuration information for the first bearer, or configured for the terminal device, or configured for a cell group.

Optionally, in some implementations, in the act S320, the terminal device determines the RLC entity for transmitting the PDCP PDU according to the cell groups corresponding to the primary RLC entity and the secondary RLC entity among the at least three RLC entities, which may specifically include at least one of the following: if the primary RLC entity and the secondary RLC entity correspond to different cell groups, the terminal device determines to use the primary RLC entity and the secondary RLC entity to transmit a PDCP PDU through split transmission, or the terminal device transmits a PDCP PDU to the primary RLC entity and the secondary RLC entity; if the primary RLC entity and the secondary RLC entity correspond to the same cell group, the terminal device determines to use the primary RLC entity or the secondary RLC entity to transmit a PDCP PDU, or the terminal device transmits a PDCP PDU to the primary RLC entity or the secondary RLC entity; if the primary RLC entity and the secondary RLC entity correspond to the same cell group, the terminal device determines to use a first RLC entity and a second RLC entity to transmit a PDCP PDU through split transmission, or the terminal device transmits a PDCP PDU to a first RLC entity and a second RLC entity; if the primary RLC entity and the secondary RLC entity correspond to the same cell group and a condition for split transmission is met, the terminal device determines to use a first RLC entity and a second RLC entity to transmit a PDCP PDU through split transmission, or the terminal device transmits a PDCP PDU to a first RLC entity and a second RLC entity; if the primary RLC entity and the secondary RLC entity correspond to the same cell group and a condition for split transmission is not met, the terminal device determines to use the primary RLC entity or the secondary RLC entity to transmit a PDCP PDU, or the terminal device transmits a PDCP PDU to the primary RLC entity or the secondary RLC entity; if a cell group which is the same as a cell group corresponding to the primary RLC entity in at least two cell groups configured for the first bearer only corresponds to one RLC entity and the one RLC entity is the primary RLC entity, the terminal device determines to use the primary RLC entity to transmit a PDCP PDU, or the terminal device transmits a PDCP PDU to the primary RLC entity; if there is only one RLC entity in a MAC entity where the primary RLC entity is located, the terminal device determines that an RLC entity corresponding to a cell group different from a cell group corresponding to the primary RLC entity is the secondary RLC entity, and the terminal device determines to use the primary RLC entity and the secondary RLC entity to transmit a PDCP PDU through split transmission, or the terminal device transmits a PDCP PDU to the primary RLC entity and the secondary RLC entity; if there are multiple RLC entities in a MAC entity where the primary RLC entity is located, and there is an RLC entity in a MAC entity different from the MAC entity where the primary RLC entity is located, the terminal device determines that an RLC entity corresponding to a cell group different from a cell group corresponding to the primary RLC entity is the secondary RLC entity, and the terminal device determines to use the primary RLC entity and the secondary RLC entity to transmit a PDCP PDU through split transmission, or the terminal device transmits a PDCP PDU to the primary RLC entity and the secondary RLC entity.

Optionally, in some implementations, in the act S320, the terminal device determines the MAC entity to which the PDCP data volume pending for transmission is mapped according to the cell groups corresponding to the primary RLC entity and the secondary RLC entity among the at least three RLC entities, which may specifically include at least one of the following: the terminal device maps the PDCP data volume pending for transmission to a MAC entity corresponding to the primary RLC entity and a MAC entity corresponding to the secondary RLC entity if the primary RLC entity and the secondary RLC entity correspond to different cell groups; the terminal device maps the PDCP data volume pending for transmission to a MAC entity corresponding to the primary RLC entity if the primary RLC entity and the secondary RLC entity correspond to the same cell group; the terminal device maps the PDCP data volume pending for transmission to a MAC entity corresponding to the primary RLC entity and maps 0 to a MAC entity corresponding to the secondary RLC entity if the primary RLC entity and the secondary RLC entity correspond to the same cell group; the terminal device maps the PDCP data volume pending for transmission to a MAC entity corresponding to a first RLC entity and a MAC entity corresponding to a second RLC entity if the primary RLC entity and the secondary RLC entity correspond to the same cell group; the terminal device maps the PDCP data volume pending for transmission to a MAC entity corresponding to a first RLC entity and a MAC entity corresponding to a second RLC entity if the primary RLC entity and the secondary RLC entity correspond to the same cell group and a condition for split transmission is met; the terminal device maps the PDCP data volume pending for transmission to a MAC entity corresponding to the primary RLC entity and a MAC entity corresponding to the secondary RLC entity if the primary RLC entity and the secondary RLC entity correspond to the same cell group; the terminal device maps the PDCP data volume pending for transmission to a MAC entity corresponding to the primary RLC entity and a MAC entity corresponding to the secondary RLC entity if the primary RLC entity and the secondary RLC entity correspond to the same cell group and a condition for split transmission is met; the terminal device maps the PDCP data volume pending for transmission to a MAC entity corresponding to the primary RLC entity if the primary RLC entity and the secondary RLC entity correspond to the same cell group and a condition for split transmission is not met; the terminal device maps the PDCP data volume pending for transmission to a MAC entity corresponding to the primary RLC entity and maps 0 to a MAC entity corresponding to the secondary RLC entity if the primary RLC entity and the secondary RLC entity correspond to the same cell group and a condition for split transmission is not met; if a cell group which is the same as a cell group corresponding to the primary RLC entity in at least two cell groups configured for the first bearer only corresponds to one RLC entity and the one RLC entity is the primary RLC entity, the terminal device determines to use the primary RLC entity to transmit a PDCP PDU, or the terminal device maps the PDCP data volume pending for transmission to a MAC entity corresponding to the primary RLC entity; if there is only one RLC entity in a MAC entity where the primary RLC entity is located, the terminal device determines that an RLC entity corresponding to a cell group different from a cell group corresponding to the primary RLC entity is the secondary RLC entity, and the terminal device maps the PDCP data volume pending for transmission to a MAC entity corresponding to the primary RLC entity and a MAC entity corresponding to the secondary RLC entity; if there are multiple RLC entities in a MAC entity where the primary RLC entity is located, and there is an RLC entity in a MAC entity different from the MAC entity where the primary RLC entity is located, the terminal device determines that an RLC entity corresponding to a cell group different from a cell group corresponding to the primary RLC entity is the secondary RLC entity, and the terminal device maps the PDCP data volume pending for transmission to a MAC entity corresponding to the primary RLC entity and a MAC entity corresponding to the secondary RLC entity.

Optionally, the first RLC entity and the second RLC entity correspond to different cell groups.

Optionally, the first RLC entity and the second RLC entity may meet the following condition: the first RLC entity is the primary RLC entity, and the second RLC entity is a specific RLC entity corresponding to a cell group different from a cell group corresponding to the first RLC entity; or, the first RLC entity is the secondary RLC entity, and the second RLC entity is a specific RLC entity corresponding to a cell group different from a cell group corresponding to the first RLC entity; or, the first RLC entity is the secondary RLC entity and the second RLC entity is the primary RLC entity; or, the first RLC entity is the primary RLC entity, and the second RLC entity is the secondary RLC entity.

Optionally, the specific RLC entity is one of the following: any one RLC entity, an RLC entity with the smallest index identifier, an RLC entity with the largest index identifier, an RLC entity with the best channel quality, and an indicated RLC entity.

Optionally, the condition for split transmission includes that data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for transmission, a total amount of PDCP data volume and RLC data volume pending for initial transmission; in an RLC entity that had been activated and is configured for the first bearer for initial transmission of data, a total amount of PDCP data volume and RLC data volume pending for initial transmission; a total amount of PDCP data volume and RLC data volume pending for initial transmission in the primary RLC entity and the secondary RLC entity; a total amount of PDCP data volume and RLC data volume pending for transmission in the primary RLC entity and the secondary RLC entity.

Optionally, in some implementations, the terminal device determines cell groups corresponding to the primary RLC entity and the secondary RLC entity among the at least three RLC entities according to configuration information for the first bearer.

Optionally, the configuration information includes at least one of the following: an identifier of the first bearer, an identifier of an RLC entity, an LCH identifier, an identifier of a cell group, the number of RLC entities, a threshold of uplink data split transmission, an identifier of a MAC entity, information of a primary RLC entity, and information of a secondary RLC entity, and indication information for indicating whether the primary RLC entity and the secondary RLC entity belong to the same cell group.

Optionally, in an implementation of the present disclosure, information of an RLC entity may be an identifier of an RLC entity, or may be an identification bit for identifying a primary RLC entity or a secondary RLC entity.

Optionally, the configuration information is carried in at least one of the following signaling: MAC CE, DCI, and RRC signaling.

Therefore, in an implementation of the present disclosure, in a case that duplication transmission of a first bearer is deactivated, a terminal device may determine cell groups corresponding to a primary RLC entity and a secondary RLC entity among at least three RLC entities configured for the first bearer based on indication information for the first bearer sent by a network device, and further determine an RLC entity for transmitting a PDCP PDU, and/or, determine a MAC entity to which PDCP data volume pending for transmission is mapped.

Further, when a primary RLC entity and a secondary RLC entity belong to the same cell group, split transmission is not used.

Or, when a primary RLC entity and a secondary RLC entity belong to the same cell group and a condition for split transmission is met, two RLC entities belonging to different cell groups are selected for split transmission. It may be ensured that there are more resources to transmit PDCP PDUs when data volume is large.

With reference to FIGS. 3 to 11, the wireless communication method according to an implementation of the present disclosure is described in detail from a perspective of a terminal device. It should be understood that the description in FIG. 13 corresponds to the description in FIGS. 3 to 11, and a similar description may refer to the above description, which will not be repeated here to avoid repetition.

Figure 13:
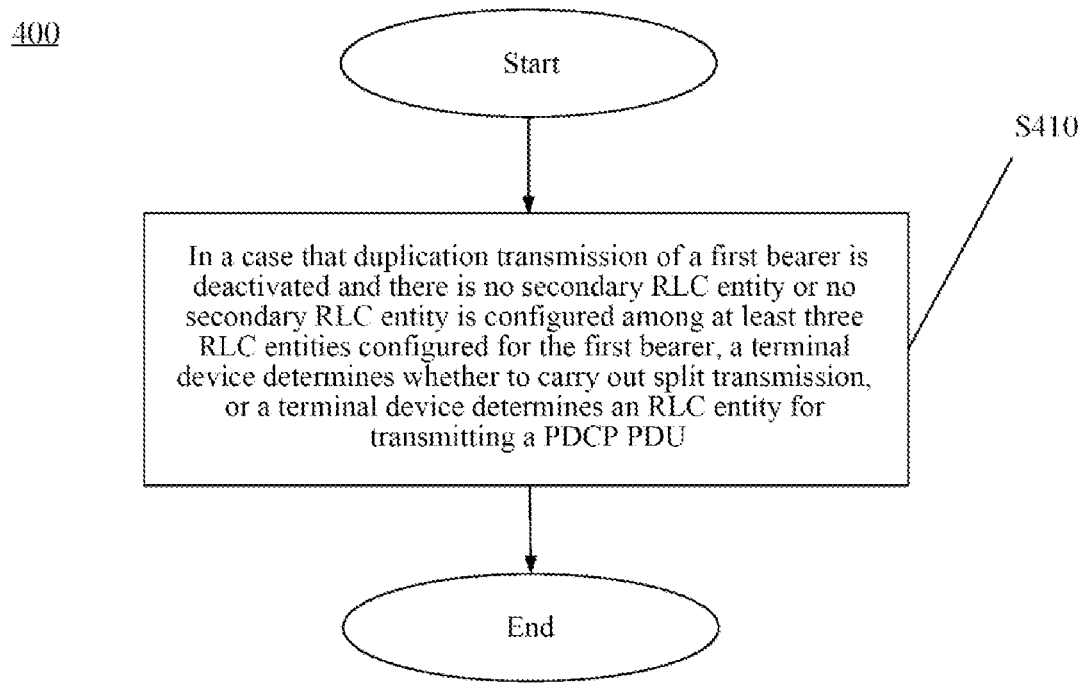
FIG. 13 is a schematic flowchart of yet another wireless communication method provided according to an implementation of the present disclosure.

FIG. 13 is a schematic flow chart of a wireless communication method 400 provided according to an implementation of the present disclosure. The method 400 may be performed by a terminal device in the communication system shown in FIG. 1. As shown in FIG. 13, the method 400 may include at least part of following contents.

In S410, in a case that duplication transmission of a first bearer is deactivated and there is no secondary RLC entity or no secondary RLC entity is configured among at least three RLC entities configured for the first bearer, a terminal device determines whether to carry out split transmission, or a terminal device determines an RLC entity for transmitting a PDCP PDU.

Optionally, in the act S410, the terminal device determines the RLC entity for transmitting the PDCP PDU, which may specifically include one of the following: the terminal device determines to use a primary RLC entity among the at least three RLC entities to transmit a PDCP PDU, or the terminal device transmits a PDCP PDU to a primary RLC entity; if a condition for split transmission is met, the terminal device determines to use a first RLC entity and a second RLC entity among the at least three RLC entities to transmit a PDCP PDU through split transmission, or the terminal device transmits a PDCP PDU to a first RLC entity and a second RLC entity among the at least three RLC entities; if a condition for split transmission is not met, the terminal device determines to use a primary RLC entity among the at least three RLC entities to transmit a PDCP PDU, or the terminal device transmits a PDCP PDU to the primary RLC entity.

Optionally, the first RLC entity and the second RLC entity correspond to different cell groups. In addition, the first RLC entity and the second RLC entity may correspond to the same cell group.

Optionally, descriptions of the first RLC entity and the second RLC entity may refer to the example in the method 200.

Optionally, in an implementation of the present disclosure, the terminal device may receive first indication information of a network device for the first bearer, and determine cell groups corresponding to the first RLC entity and the second RLC entity according to the first indication information, or determine whether the first RLC entity and the second RLC entity correspond to the same cell group.

It should be noted that the first indication information may not be limited to be for the first bearer, for example, the first indication information may be for a terminal device, or the first indication information may be for a MAC entity or a cell group.

Optionally, the first indication information is at least one of the following signaling: MAC CE, DCI, and RRC signaling.

Optionally, in an implementation of the present disclosure, the terminal device may receive second indication information of a network device for the first bearer, and determine, according to the second indication information, that in a case that there is no secondary RLC entity or no secondary RLC entity is configured, according to the second indication information, the terminal device determines whether to use split transmission or transmit a PDCP PDU to multiple RLC entities.

It should be noted that the second indication information may not be limited to be for the first bearer, for example, the second indication information may be for a terminal device, or the second indication information may be for a MAC entity or a cell group.

Optionally, the second indication information is carried in at least one of the following signaling: MAC CE, DCI, and RRC signaling.

Optionally, the first indication information and the second indication information may be carried in the same signaling or different signaling, which is not limited by the present disclosure.

In an implementation of the present disclosure, the first indication information may be specifically indicated in the following manner: if the first indication information is carried in first signaling or a value of the first indication information is a first value, the first indication information is used to indicate that a first RLC entity and a second RLC entity in at least two cell groups configured for the first bearer correspond to different cell groups; or, if the first indication information is not carried in first signaling or a value of the first indication information is a second value, the first indication information is used to indicate that a first RLC entity and a second RLC entity in at least two cell groups configured for the first bearer correspond to the same cell group.

In an implementation of the present disclosure, the first indication information may be specifically indicated in the following manner: if the first indication information is not carried in first signaling or a value of the first indication information is a first value, the first indication information is used to indicate that a first RLC entity and a second RLC entity in at least two cell groups configured for the first bearer correspond to different cell groups; or if the first indication information is carried in first signaling or a value of the first indication information is a second value, the first indication information is used to indicate that a first RLC entity and a second RLC entity in at least two cell groups configured for the first bearer correspond to the same cell group.

Optionally, the first indication information occupies a resource of 1 bit, wherein the first value is 1 and the second value is 0, or the first value is 0 and the second value is 1.

Optionally, the first indication information is configured through configuration information for the first bearer, or configured for a terminal device, or configured for a cell group.

Optionally, the first RLC entity is the primary RLC entity, and the second RLC entity is a specific RLC entity corresponding to a cell group different from a cell group corresponding to the first RLC entity.

Optionally, the specific RLC entity is one of the following: any one RLC entity, an RLC entity with the smallest index identifier, an RLC entity with the largest index identifier, an RLC entity with the best channel quality, and an indicated RLC entity.

Optionally, the condition for split transmission includes that data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for transmission, a total amount of PDCP data volume and RLC data volume pending for initial transmission; and in an RLC entity that had been activated and is configured for the first bearer for initial transmission of data, a total amount of PDCP data volume and RLC data volume pending for initial transmission.

Optionally, in some implementations, the terminal device determines that there is no secondary RLC entity among the at least three RLC entities according to configuration information for the first bearer.

Optionally, the configuration information includes at least one of the following: an identifier of the first bearer, an identifier of an RLC entity, an LCH identifier, an identifier of a cell group, the number of RLC entities, a threshold of uplink data split transmission, an identifier of a MAC entity, and information of a primary RLC entity.

Optionally, in an implementation of the present disclosure, information of an RLC entity may be an identifier of an RLC entity, or may be an identification bit for identifying a primary RLC entity or a secondary RLC entity.

Optionally, the configuration information is carried in at least one of the following signaling: MAC CE, DCI, and RRC signaling.

Therefore, in an implementation of the present disclosure, a terminal device determines an RLC entity that transmits a PDCP PDU in a case that duplication transmission of a first bearer is deactivated and there is no secondary RLC entity among at least three RLC entities configured for the first bearer.

Method implementations of the present disclosure are described in detail above with reference to FIG. 3 to FIG. 13, apparatus implementations of the present disclosure will be described in detail below with reference to FIG. 14 to FIG. 19. It should be understood that the apparatus implementations and the method implementations correspond to each other, and description of the method implementations may be referred to for similar description of the apparatus implementations.

Figure 14:
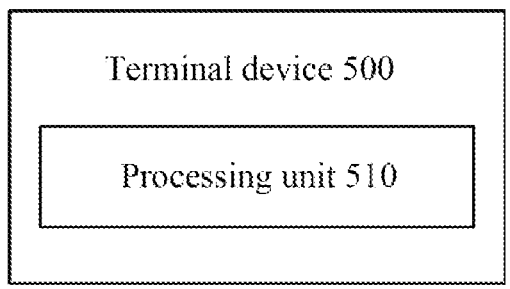
FIG. 14 is a schematic block diagram of a terminal device provided according to an implementation of the present disclosure.

FIG. 14 is a schematic block diagram of a terminal device 500 according to an implementation of the present disclosure. As shown in FIG. 14, the terminal device 500 includes a processing unit 510.

In a case that duplication transmission of a first bearer is deactivated, the processing unit 510 is configured to determine an RLC entity for transmitting a PDCP PDU according to cell groups corresponding to a primary RLC entity and a secondary RLC entity among at least three RLC entities configured for the first bearer, and/or the processing unit 510 is configured to determine a MAC entity to which PDCP data volume pending for transmission is mapped according to cell groups corresponding to a primary RLC entity and a secondary RLC entity among at least three RLC entities configured for the first bearer.

Optionally, the processing unit 510 is configured to determine the RLC entity for transmitting the PDCP PDU according to the cell groups corresponding to the primary RLC entity and the secondary RLC entity among the at least three RLC entities configured for the first bearer, including at least one of the following: if the primary RLC entity and the secondary RLC entity correspond to different cell groups, the processing unit 510 is configured to determine to use the primary RLC entity and the secondary RLC entity to transmit a PDCP PDU through split transmission, or to transmit a PDCP PDU to the primary RLC entity and the secondary RLC entity; if the primary RLC entity and the secondary RLC entity correspond to the same cell group, the processing unit 510 is configured to determine to use the primary RLC entity or the secondary RLC entity to transmit a PDCP PDU, or to transmit a PDCP PDU to the primary RLC entity or the secondary RLC entity; if the primary RLC entity and the secondary RLC entity correspond to the same cell group, the processing unit 510 is configured to determine to use a first RLC entity and a second RLC entity to transmit a PDCP PDU through split transmission, or to transmit a PDCP PDU to a first RLC entity and a second RLC entity; if the primary RLC entity and the secondary RLC entity correspond to the same cell group and a condition for split transmission is met, the processing unit 510 is configured to determine to use a first RLC entity and a second RLC entity to transmit a PDCP PDU through split transmission, or to transmit a PDCP PDU to a first RLC entity and a second RLC entity; if the primary RLC entity and the secondary RLC entity correspond to the same cell group and a condition for split transmission is not met, the processing unit 510 is configured to determine to use the primary RLC entity or the secondary RLC entity to transmit a PDCP PDU, or to transmit a PDCP PDU to the primary RLC entity or the secondary RLC entity; if a cell group which is the same as a cell group corresponding to the primary RLC entity in at least two cell groups configured for the first bearer only corresponds to one RLC entity and the one RLC entity is the primary RLC entity, the processing unit 510 is configured to determine to use the primary RLC entity to transmit a PDCP PDU, or to transmit a PDCP PDU to the primary RLC entity; if there is only one RLC entity in a MAC entity where the primary RLC entity is located, the processing unit 510 is configured to determine that an RLC entity corresponding to a cell group different from a cell group corresponding to the primary RLC entity is the secondary RLC entity, and the processing unit 510 is configured to determine to use the primary RLC entity and the secondary RLC entity to transmit a PDCP PDU through split transmission, or to transmit a PDCP PDU to the primary RLC entity and the secondary RLC entity; and if there are multiple RLC entities in a MAC entity where the primary RLC entity is located, and there is an RLC entity in a MAC entity different from the MAC entity where the primary RLC entity is located, the processing unit 510 is configured to determine that an RLC entity corresponding to a cell group different from a cell group corresponding to the primary RLC entity is the secondary RLC entity, and the processing unit 510 is configured to determine to use the primary RLC entity and the secondary RLC entity to transmit a PDCP PDU through split transmission, or the processing unit 510 is configured to transmit a PDCP PDU to the primary RLC entity and the secondary RLC entity.

Optionally, the processing unit 510 is configured to determine the MAC entity to which the PDCP data volume pending for transmission is mapped according to the cell groups corresponding to the primary RLC entity and the secondary RLC entity among the at least three RLC entities configured for the first bearer, including at least one of the following: if the primary RLC entity and the secondary RLC entity correspond to different cell groups, the processing unit 510 is configured to map the PDCP data volume pending for transmission to a MAC entity corresponding to the primary RLC entity and a MAC entity corresponding to the secondary RLC entity; if the primary RLC entity and the secondary RLC entity correspond to the same cell group, the processing unit 510 is configured to map the PDCP data volume pending for transmission to a MAC entity corresponding to the primary RLC entity; if the primary RLC entity and the secondary RLC entity correspond to the same cell group, the processing unit 510 maps the PDCP data volume pending for transmission to a MAC entity corresponding to the primary RLC entity and a MAC entity corresponding to the secondary RLC entity; if the primary RLC entity and the secondary RLC entity correspond to the same cell group and a condition for split transmission is met, the processing unit 510 maps the PDCP data volume pending for transmission to a MAC entity corresponding to the primary RLC entity and a MAC entity corresponding to the secondary RLC entity; if the primary RLC entity and the secondary RLC entity correspond to the same cell group, the processing unit 510 is configured to map the PDCP data volume pending for transmission to a MAC entity corresponding to the primary RLC entity and map 0 to a MAC entity corresponding to the secondary RLC entity; if the primary RLC entity and the secondary RLC entity correspond to the same cell group, the processing unit 510 is configured to map the PDCP data volume pending for transmission to a MAC entity corresponding to a first RLC entity and a MAC entity corresponding to a second RLC entity; if the primary RLC entity and the secondary RLC entity correspond to the same cell group and a condition for split transmission is met, the processing unit 510 is configured to map the PDCP data volume pending for transmission to a MAC entity corresponding to a first RLC entity and a MAC entity corresponding to a second RLC entity; if the primary RLC entity and the secondary RLC entity correspond to the same cell group and a condition for split transmission is not met, the processing unit 510 is configured to map the PDCP data volume pending for transmission to a MAC entity corresponding to the primary RLC entity; if the primary RLC entity and the secondary RLC entity correspond to the same cell group and a condition for split transmission is not met, the processing unit 510 is configured to map the PDCP data volume pending for transmission to a MAC entity corresponding to the primary RLC entity and map 0 to a MAC entity corresponding to the secondary RLC entity; if a cell group which is the same as a cell group corresponding to the primary RLC entity in at least two cell groups configured for the first bearer only corresponds to one RLC entity and the one RLC entity is the primary RLC entity, the processing unit 510 is configured to determine to use the primary RLC entity to transmit a PDCP PDU, or the processing unit 510 is configured to map the PDCP data volume pending for transmission to a MAC entity corresponding to the primary RLC entity; if there is only one RLC entity in a MAC entity where the primary RLC entity is located, the processing unit 510 is configured to determine that an RLC entity corresponding to a cell group different from a cell group corresponding to the primary RLC entity is the secondary RLC entity, and the processing unit 510 is configured to map the PDCP data volume pending for transmission to a MAC entity corresponding to the primary RLC entity and a MAC entity corresponding to the secondary RLC entity; and if there are multiple RLC entities in a MAC entity where the primary RLC entity is located, and there is an RLC entity in a MAC entity different from the MAC entity where the primary RLC entity is located, the processing unit 510 is configured to determine an RLC entity corresponding to a cell group different from a cell group corresponding to the primary RLC entity as the secondary RLC entity, and the processing unit 510 is configured to map the PDCP data volume pending for transmission to a MAC entity corresponding to the primary RLC entity and a MAC entity corresponding to the secondary RLC entity.

Optionally, the first RLC entity and the second RLC entity correspond to different cell groups.

Optionally, the first RLC entity is the primary RLC entity, and the second RLC entity is a specific RLC entity corresponding to a cell group different from a cell group corresponding to the first RLC entity; or, the first RLC entity is the secondary RLC entity, and the second RLC entity is a specific RLC entity corresponding to a cell group different from a cell group corresponding to the first RLC entity; or, the first RLC entity is the secondary RLC entity and the second RLC entity is the primary RLC entity; or, the first RLC entity is the primary RLC entity, and the second RLC entity is the secondary RLC entity.

Optionally, the specific RLC entity is one of the following: any one RLC entity, an RLC entity with the smallest index identifier, an RLC entity with the largest index identifier, an RLC entity with the best channel quality, and an indicated RLC entity.

Optionally, the condition for split transmission includes that data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for transmission, a total amount of PDCP data volume and RLC data volume pending for initial transmission; in an RLC entity that had been activated and is configured for the first bearer for initial transmission of data, a total amount of PDCP data volume and RLC data volume pending for initial transmission; a total amount of PDCP data volume and RLC data volume pending for initial transmission in the primary RLC entity and the secondary RLC entity; and a total amount of PDCP data volume and RLC data volume pending for transmission in the primary RLC entity and the secondary RLC entity.

Optionally, the processing unit 510 is further configured to determine cell groups corresponding to the primary RLC entity and the secondary RLC entity among the at least three RLC entities according to configuration information for the first bearer.

Optionally, the configuration information includes at least one of the following: an identifier of the first bearer, an identifier of an RLC entity, a Logical Channel (LCH) identifier, an identifier of a cell group, the number of RLC entities, a threshold of uplink data split transmission, an identifier of a MAC entity, information of a primary RLC entity, information of a secondary RLC entity, and indication information for indicating whether the primary RLC entity and the secondary RLC entity belong to the same cell group.

Optionally, the configuration information is carried in at least one of the following signaling: MAC CE, DCI, and RRC signaling.

Optionally, the processing unit 510 is further configured to, according to indication information for the first bearer, determine cell groups corresponding to the primary RLC entity and the secondary RLC entity among the at least three RLC entities, or determine a cell group corresponding to an RLC entity used for split transmission among the at least three RLC entities.

Optionally, the indication information is used to indicate an RLC entity corresponding to split transmission among the at least three RLC entities, or to indicate a secondary RLC entity corresponding to split transmission among the at least three RLC entities, or to indicate whether an RLC entity among the at least three RLC entities meets split transmission.

Optionally, if first signaling carries the indication information, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is not carried in first signaling or a value of the indication information is a second value, the indication information is used to indicate that in at least two cell groups configured for the first bearer, an RLC entity corresponding to a cell group which is the same as a cell group corresponding to the primary RLC entity is a secondary RLC entity; or, if first signaling carries the indication information or a value of the indication information is a first value, the indication information is used to indicate that in at least two cell groups configured for the first bearer, only an RLC entity corresponding to a cell group different from a cell group corresponding to the primary RLC entity is a secondary RLC entity; or, if the indication information is not carried in first signaling, or a value of the indication information is a second value, the indication information is used to indicate that in at least two cell groups configured for the first bearer, an RLC entity corresponding to a cell group which is the same as or different from a cell group corresponding to the primary RLC entity is a secondary RLC entity.

Optionally, if the indication information is not carried in first signaling, or a value of the indication information is a first value, the indication information is used to indicate that an RLC entity corresponding to a cell group different from a cell group corresponding to the primary RLC entity in at least two cell groups configured for the first bearer is a secondary RLC entity; or, if first signaling carries the indication information or a value of the indication information is a second value, the indication information is used to indicate that in at least two cell groups configured for the first bearer, an RLC entity corresponding to a cell group which is the same as a cell group corresponding to the primary RLC entity is a secondary RLC entity; or, if the indication information is not carried in first signaling, or a value of the indication information is a first value, the indication information is used to indicate that in at least two cell groups configured for the first bearer, only an RLC entity corresponding to a cell group different from a cell group corresponding to the primary RLC entity is a secondary RLC entity; or, if first signaling carries the indication information, or a value of the indication information is a second value, the indication information is used to indicate that in at least two cell groups configured for the first bearer, an RLC entity corresponding to a cell group which is the same as or different from a cell group corresponding to the primary RLC entity is a secondary RLC entity.

Optionally, the indication information occupies a resource of 1 bit, wherein the first value is 1 and the second value is 0, or the first value is 0 and the second value is 1.

Optionally, the first signaling is at least one of the following signaling: MAC CE, DCI, and RRC signaling.

Optionally, the indication information is configured through configuration information for the first bearer, or configured for a terminal device, or configured for a cell group.

Optionally, in some implementations, the processing unit may be one or more processors.

It should be understood that the terminal device 500 according to an implementation of the present disclosure may correspond to the terminal device in a method implementation of the present disclosure, and the above-mentioned and other operations and/or functions of various units in the terminal device 500 are respectively for implementing the corresponding flows of the terminal device in the method 200 as shown in FIG. 3, which will not be repeated here for brevity.

Figure 15:
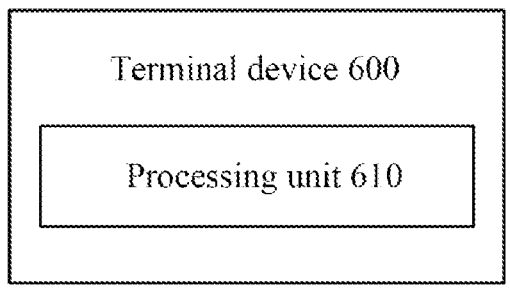
FIG. 15 is a schematic block diagram of another terminal device provided according to an implementation of the present disclosure.

FIG. 15 is a schematic block diagram of a terminal device 600 according to an implementation of the present disclosure. As shown in FIG. 15, the terminal device 600 includes a processing unit 610.

In a case that duplication transmission of a first bearer is deactivated, the processing unit 610 is configured to determine cell groups corresponding to a primary RLC entity and a secondary RLC entity among at least three RLC entities configured for the first bearer according to indication information for the first bearer; the processing unit 610 is configured to determine an RLC entity for transmitting a PDCP PDU according to cell groups corresponding to the primary RLC entity and the secondary RLC entity among the at least three RLC entities, and/or the processing unit 610 is configured to determine a MAC entity to which PDCP data volume pending for transmission is mapped according to cell groups corresponding to the primary RLC entity and the secondary RLC entity among the at least three RLC entities.

Optionally, the indication information is used to indicate an RLC entity corresponding to split transmission among the at least three RLC entities, or to indicate a secondary RLC entity corresponding to split transmission among the at least three RLC entities, or to indicate whether an RLC entity among the at least three RLC entities meets split transmission.

Optionally, if first signaling carries the indication information, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is not carried in first signaling, or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if first signaling carries the indication information, or a value of the indication information is a first value, the indication information is used to indicate that only an RLC entity corresponding to a cell group different from a cell group corresponding to the primary RLC entity in at least two cell groups configured for the first bearer is a secondary RLC entity; or, if the indication information is not carried in first signaling, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

Optionally, if the indication information is not carried in first signaling, or a value of the indication information is a first value, the indication information is used to indicate that an RLC entity corresponding to a cell group different from a cell group corresponding to the primary RLC entity in at least two cell groups configured for the first bearer is a secondary RLC entity; or, if the indication information is carried in first signaling or a value of the indication information is a second value, the indication information is used to indicate that an RLC entity corresponding to a cell group which is the same as a cell group corresponding to the primary RLC entity in at least two cell groups configured for the first bearer is a secondary RLC entity; or, if the indication information is not carried in first signaling, or a value of the indication information is a first value, the indication information is used to indicate that only an RLC entity corresponding to a cell group different from a cell group corresponding to the primary RLC entity in at least two cell groups configured for the first bearer is a secondary RLC entity; or, if first signaling carries the indication information, or a value of the indication information is a second value, the indication information is used to indicate that an RLC entity corresponding to a cell group which is the same as or different from a cell group corresponding to the primary RLC entity in at least two cell groups configured for the first bearer is a secondary RLC entity.

Optionally, the indication information occupies a resource of 1 bit, wherein the first value is 1 and the second value is 0, or the first value is 0 and the second value is 1.

Optionally, the first signaling is at least one of the following signaling: MAC CE, DCI, and RRC signaling.

Optionally, the indication information is configured through configuration information for the first bearer, or configured for the terminal device, or configured for a cell group.

Optionally, the processing unit 610 is configured to determine the RLC entity for transmitting the PDCP PDU according to the cell groups corresponding to the primary RLC entity and the secondary RLC entity among the at least three RLC entities, including at least one of the following: if the primary RLC entity and the secondary RLC entity correspond to different cell groups, the processing unit 610 is configured to determine to use the primary RLC entity and the secondary RLC entity to transmit a PDCP PDU through split transmission, or to transmit a PDCP PDU to the primary RLC entity and the secondary RLC entity; if the primary RLC entity and the secondary RLC entity correspond to the same cell group, the processing unit 610 is configured to determine to use the primary RLC entity or the secondary RLC entity to transmit a PDCP PDU, or to transmit a PDCP PDU to the primary RLC entity or the secondary RLC entity; if the primary RLC entity and the secondary RLC entity correspond to the same cell group, the processing unit 610 is configured to determine to use a first RLC entity and a second RLC entity to transmit a PDCP PDU through split transmission, or to transmit a PDCP PDU to a first RLC entity and a second RLC entity; if the primary RLC entity and the secondary RLC entity correspond to the same cell group and a condition for split transmission is met, the processing unit 610 is configured to determine to use a first RLC entity and a second RLC entity to transmit a PDCP PDU through split transmission, or to transmit a PDCP PDU to a first RLC entity and a second RLC entity; if the primary RLC entity and the secondary RLC entity correspond to the same cell group and a condition for split transmission is not met, the processing unit 610 is configured to determine to use the primary RLC entity or the secondary RLC entity to transmit a PDCP PDU, or to transmit a PDCP PDU to the primary RLC entity or the secondary RLC entity; if a cell group which is the same as a cell group corresponding to the primary RLC entity in at least two cell groups configured for the first bearer only corresponds to one RLC entity and the one RLC entity is the primary RLC entity, the processing unit 610 is configured to determine to use the primary RLC entity to transmit a PDCP PDU, or to transmit a PDCP PDU to the primary RLC entity; if there is only one RLC entity in a MAC entity where the primary RLC entity is located, the processing unit 610 is configured to determine that an RLC entity corresponding to a cell group different from a cell group corresponding to the primary RLC entity is the secondary RLC entity, and the processing unit 610 is configured to determine to use the primary RLC entity and the secondary RLC entity to transmit a PDCP PDU through split transmission, or to transmit a PDCP PDU to the primary RLC entity and the secondary RLC entity; and if there are multiple RLC entities in a MAC entity where the primary RLC entity is located, and there is an RLC entity exists in a MAC entity different from the MAC entity where the primary RLC entity is located, the processing unit 610 is configured to determine that an RLC entity corresponding to a cell group different from a cell group corresponding to the primary RLC entity is the secondary RLC entity, and the processing unit 610 is configured to determine to use the primary RLC entity and the secondary RLC entity to transmit a PDCP PDU through split transmission, or the processing unit 610 is configured to transmit a PDCP PDU to the primary RLC entity and the secondary RLC entity.

Optionally, the processing unit 610 is configured to determine the MAC entity to which the PDCP data volume pending for transmission is mapped according to the cell groups corresponding to the primary RLC entity and the secondary RLC entity among the at least three RLC entities, including at least one of the following: if the primary RLC entity and the secondary RLC entity correspond to different cell groups, the processing unit 610 is configured to map the PDCP data volume pending for transmission to a MAC entity corresponding to the primary RLC entity and a MAC entity corresponding to the secondary RLC entity; if the primary RLC entity and the secondary RLC entity correspond to the same cell group, the processing unit 610 is configured to map the PDCP data volume pending for transmission to a MAC entity corresponding to the primary RLC entity; if the primary RLC entity and the secondary RLC entity correspond to the same cell group, the processing unit 610 maps the PDCP data volume pending for transmission to a MAC entity corresponding to the primary RLC entity and a MAC entity corresponding to the secondary RLC entity; if the primary RLC entity and the secondary RLC entity correspond to the same cell group and a condition for split transmission is met, the processing unit 610 maps the PDCP data volume pending for transmission to a MAC entity corresponding to the primary RLC entity and a MAC entity corresponding to the secondary RLC entity; if the primary RLC entity and the secondary RLC entity correspond to the same cell group, the processing unit 610 is configured to map the PDCP data volume pending for transmission to a MAC entity corresponding to the primary RLC entity and map 0 to a MAC entity corresponding to the secondary RLC entity; if the primary RLC entity and the secondary RLC entity correspond to the same cell group, the processing unit 610 is configured to map the PDCP data volume pending for transmission to a MAC entity corresponding to a first RLC entity and a MAC entity corresponding to a second RLC entity; if the primary RLC entity and the secondary RLC entity correspond to the same cell group and a condition for split transmission is met, the processing unit 610 is configured to map the PDCP data volume pending for transmission to a MAC entity corresponding to a first RLC entity and a MAC entity corresponding to a second RLC entity; if the primary RLC entity and the secondary RLC entity correspond to the same cell group and a condition for split transmission is not met, the processing unit 610 is configured to map the PDCP data volume pending for transmission to a MAC entity corresponding to the primary RLC entity; if the primary RLC entity and the secondary RLC entity correspond to the same cell group and a condition for split transmission is not met, the processing unit 610 is configured to map the PDCP data volume pending for transmission to a MAC entity corresponding to the primary RLC entity and map 0 to a MAC entity corresponding to the secondary RLC entity; if a cell group which is the same as a cell group corresponding to the primary RLC entity in at least two cell groups configured for the first bearer only corresponds to one RLC entity and the one RLC entity is the primary RLC entity, the processing unit 610 is configured to determine to use the primary RLC entity to transmit a PDCP PDU, or the processing unit 610 is configured to map the PDCP data volume pending for transmission to a MAC entity corresponding to the primary RLC entity; if there is only one RLC entity in a MAC entity where the primary RLC entity is located, the processing unit 610 is configured to determine that an RLC entity corresponding to a cell group different from a cell group corresponding to the primary RLC entity is the secondary RLC entity, and the processing unit 610 is configured to map the PDCP data volume pending for transmission to a MAC entity corresponding to the primary RLC entity and a MAC entity corresponding to the secondary RLC entity; and if there are multiple RLC entities in a MAC entity where the primary RLC entity is located, and there is an RLC entity in a MAC entity different from the MAC entity where the primary RLC entity is located, the processing unit 610 is configured to determine an RLC entity corresponding to a cell group different from a cell group corresponding to the primary RLC entity as the secondary RLC entity, and the processing unit 610 is configured to map the PDCP data volume pending for transmission to a MAC entity corresponding to the primary RLC entity and a MAC entity corresponding to the secondary RLC entity.

Optionally, the first RLC entity and the second RLC entity correspond to different cell groups.

Optionally, the first RLC entity is the primary RLC entity, and the second RLC entity is a specific RLC entity corresponding to a cell group different from a cell group corresponding to the first RLC entity; or, the first RLC entity is the secondary RLC entity, and the second RLC entity is a specific RLC entity corresponding to a cell group different from a cell group corresponding to the first RLC entity; or, the first RLC entity is the secondary RLC entity and the second RLC entity is the primary RLC entity; or, the first RLC entity is the primary RLC entity, and the second RLC entity is the secondary RLC entity.

Optionally, the specific RLC entity is one of the following: any one RLC entity, an RLC entity with the smallest index identifier, an RLC entity with the largest index identifier, an RLC entity with the best channel quality, and an indicated RLC entity.

Optionally, the condition for split transmission includes that data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for initial transmission, a total amount of PDCP data volume and RLC data volume pending for initial transmission; in an RLC entity that had been activated and is configured for the first bearer for initial transmission of data, a total amount of PDCP data volume and RLC data volume pending for initial transmission; a total amount of PDCP data volume and RLC data volume pending for initial transmission in the primary RLC entity and the secondary RLC entity; and a total amount of PDCP data volume and RLC data volume pending for transmission in the primary RLC entity and the secondary RLC entity.

Optionally, the processing unit 610 is further configured to determine cell groups corresponding to the primary RLC entity and the secondary RLC entity among the at least three RLC entities according to configuration information for the first bearer.

Optionally, the configuration information includes at least one of the following: an identifier of the first bearer, an identifier of an RLC entity, an LCH identifier, an identifier of a cell group, the number of RLC entities, a threshold of uplink data split transmission, an identifier of a MAC entity, information of a primary RLC entity, information of a secondary RLC entity, and indication information for indicating whether the primary RLC entity and the secondary RLC entity belong to the same cell group.

Optionally, the configuration information is carried in at least one of the following signaling: MAC CE, DCI, and RRC signaling.

Optionally, in some implementations, the processing unit may be one or more processors.

It should be understood that the terminal device 600 according to an implementation of the present disclosure may correspond to the terminal device in a method implementation of the present disclosure, and the above-mentioned and other operations and/or functions of various units in the terminal device 600 are respectively for implementing the corresponding flows of the terminal device in the method 300 as shown in FIG. 12, which will not be repeated here for brevity.

Figure 16:
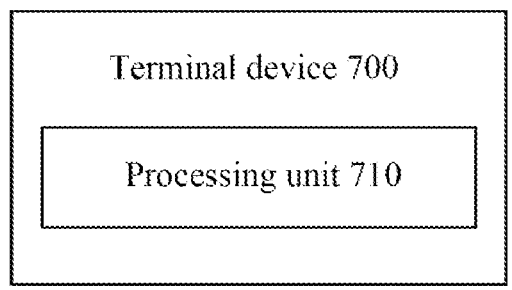
FIG. 16 is a schematic block diagram of yet another terminal device provided according to an implementation of the present disclosure.

FIG. 16 is a schematic block diagram of a terminal device 700 according to an implementation of the present disclosure. As shown in FIG. 16, the terminal device 700 includes a processing unit 710.

In a case that duplication transmission of a first bearer is deactivated and there is no secondary RLC entity or no secondary RLC entity is configured among at least three RLC entities configured for the first bearer, the processing unit 710 is configured to determine whether to carry out split transmission, or determine an RLC entity for transmitting a PDCP PDU.

Optionally, the processing unit 710 is configured to determine the RLC entity for transmitting a PDCP PDU, including one of the following: the processing unit 710 is configured to determine to use a primary RLC entity among the at least three RLC entities to transmit a PDCP PDU, or the processing unit 710 is configured to transmit a PDCP PDU to a primary RLC entity among the at least three RLC entities; if a condition for split transmission is met, the processing unit 710 is configured to determine to use a first RLC entity and a second RLC entity among the at least three RLC entities to transmit a PDCP PDU through split transmission, or to transmit a PDCP PDU to a first RLC entity and a second RLC entity among the at least three RLC entities; and if a condition for split transmission is not met, the processing unit 710 is configured to determine to use a primary RLC entity among the at least three RLC entities to transmit a PDCP PDU, or the processing unit 710 is configured to transmit a PDCP PDU to a primary RLC entity among the at least three RLC entities.

Optionally, the first RLC entity and the second RLC entity correspond to different cell groups.

Optionally, the first RLC entity is the primary RLC entity, and the second RLC entity is a specific RLC entity corresponding to a cell group different from a cell group corresponding to the first RLC entity.

Optionally, the specific RLC entity is one of the following: any one RLC entity, an RLC entity with the smallest index identifier, an RLC entity with the largest index identifier, an RLC entity with the best channel quality, and an indicated RLC entity.

Optionally, the condition for split transmission includes that data volume pending for transmission corresponding to the first bearer is greater than or equal to a threshold.

Optionally, the data volume pending for transmission corresponding to the first bearer is one of the following: in all RLC entities configured for the first bearer, a total amount of PDCP data volume and RLC data volume pending for initial transmission; in an activated RLC entity configured for the first bearer, a total amount of PDCP data volume and RLC data volume pending for initial transmission; in an RLC entity that had been activated and is configured for the first bearer, a total amount of PDCP data volume and RLC data volume pending for initial transmission; in an RLC entity that had been activated and is configured for the first bearer and has data pending for transmission, a total amount of PDCP data volume and RLC data volume pending for initial transmission; and in an RLC entity that had been activated and is configured for the first bearer for initial transmission of data, a total amount of PDCP data volume and RLC data volume pending for initial transmission.

Optionally, the processing unit 710 is further configured to determine that there is no secondary RLC entity among the at least three RLC entities according to configuration information for the first bearer.

Optionally, the configuration information includes at least one of the following: an identifier of the first bearer, an identifier of an RLC entity, a Logical Channel (LCH) identifier, an identifier of a cell group, the number of RLC entities, a threshold of uplink data split transmission, an identifier of a MAC entity, and information of a primary RLC entity.

Optionally, the configuration information is carried in at least one of the following signaling: MAC CE, DCI, and RRC signaling.

Optionally, in some implementations, the processing unit may be one or more processors.

It should be understood that the terminal device 700 according to an implementation of the present disclosure may correspond to the terminal device in a method implementation of the present disclosure, and the above-mentioned and other operations and/or functions of various units in the terminal device 700 are respectively for implementing the corresponding flows of the terminal device in the method 400 as shown in FIG. 13, which will not be repeated here for brevity.

Figure 17:
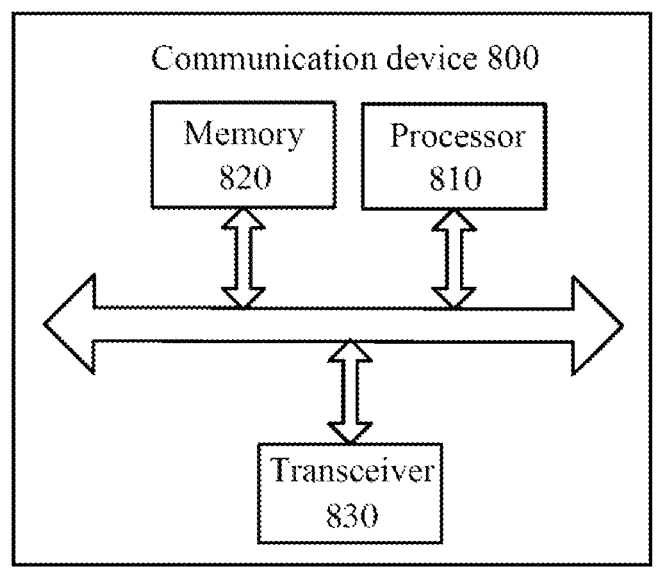
FIG. 17 is a schematic block diagram of a communication device provided according to an implementation of the present disclosure.

FIG. 17 is a schematic structural diagram of a communication device 800 provided according to an implementation of the present disclosure. The communication device 800 shown in FIG. 17 includes a processor 810 that may call and run a computer program from a memory to implement the methods in the implementations of the present disclosure.

Optionally, as shown in FIG. 17, the communication device 800 may further include a memory 820. The processor 810 may call and run the computer program from the memory 820 to implement the methods in the implementations of the present disclosure.

The memory 820 may be a separate device independent of the processor 810 or may be integrated in the processor 810.

Optionally, as shown in FIG. 17, the communication device 800 may further include a transceiver 830, and the processor 810 may control the transceiver 830 to communicate with other devices. Specifically, the transceiver 830 may send information or data to other devices or receive information or data sent by other devices.

The transceiver 830 may include a transmitter and a receiver. The transceiver 830 may further include antennas, and the number of which may be one or more.

Optionally, the communication device 800 may specifically be a network device or a base station of the implementations of the present disclosure, and the communication device 800 may implement the corresponding processes implemented by a network device or a base station in various methods of the implementations of the present disclosure, which will not be repeated herein for brevity.

Optionally, the communication device 800 may be specifically the mobile terminal/terminal device in accordance with an implementation of the present disclosure, and the communication device 800 may implement the corresponding processes implemented by the mobile terminal/terminal device in various methods in the implementations of the present disclosure, which will not be described repeatedly herein for brevity.

Figure 18:
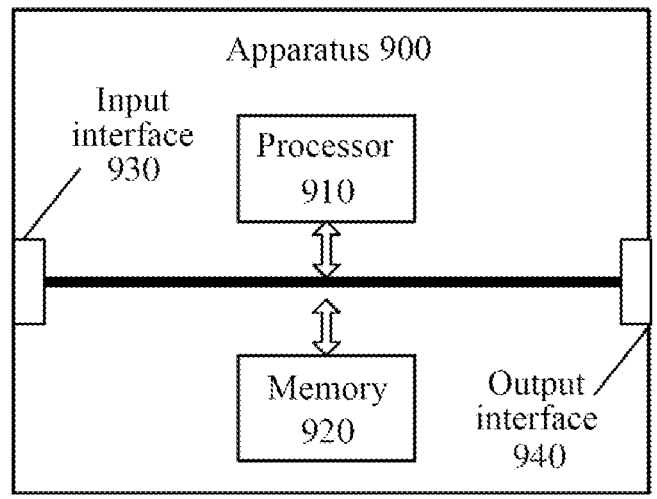
FIG. 18 is a schematic block diagram of an apparatus provided according to an implementation of the present disclosure.

FIG. 18 is a schematic diagram of a structure of an apparatus in accordance with an implementation of the present disclosure. The apparatus 900 shown in FIG. 18 includes a processor 910. The processor 910 may call and run a computer program from a memory to implement the methods in the implementations of the present disclosure.

Optionally, as shown in FIG. 18, the apparatus 900 may further include a memory 920. The processor 910 may call and run a computer program from the memory 920 to implement the methods in the implementations of the present disclosure.

The memory 920 may be a separate device independent of the processor 910 or may be integrated in the processor 910.

Optionally, the apparatus 900 may further include an input interface 930. The processor 910 may control the input interface 930 to communicate with other devices or chips. Specifically, the processor 910 may acquire information or data sent by other devices or chips.

Optionally, the apparatus 900 may further include an output interface 940. The processor 910 may control the output interface 940 to communicate with other devices or chips. Specifically, the processor 910 may output information or data to other devices or chips.

Optionally, the apparatus may be applied to a network device or a base station in the implementations of the present disclosure, and the apparatus may implement the corresponding processes implemented by a network device or a base station in various methods in the implementations of the present disclosure, which will not be repeated herein for brevity.

Optionally, the apparatus may be applied to a mobile terminal/terminal device in the implementations of the present disclosure, and the apparatus may implement the corresponding processes implemented by a mobile terminal/terminal device in various methods in the implementations of the present disclosure, which will not be described repeatedly herein for brevity.

Optionally, the apparatus mentioned in the implementations of the present disclosure may be a chip. For example, it may be a system-level chip, a system chip, a system-on-chip, or a system chip on chip.

Figure 19:
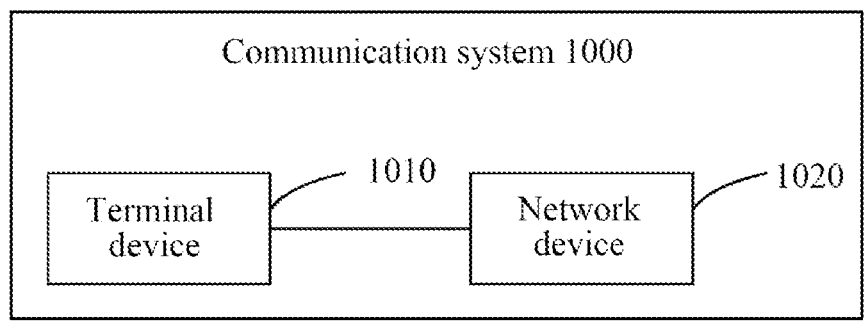
FIG. 19 is a schematic block diagram of a communication system provided according to an implementation of the present disclosure.

FIG. 19 is a schematic block diagram of a communication system 1000 provided according to an implementation of the present disclosure. As shown in FIG. 19, the communication system 1000 may include a terminal device 1010 and a network device 1020.

The terminal device 1010 may be configured to implement the corresponding functions implemented by a terminal device in the above-mentioned methods, and the network device 1020 may be configured to implement the corresponding functions implemented by a network device or a base station in the above-mentioned methods, which will not be repeated here for brevity.

It should be understood that the processor in the implementations of the present disclosure may be an integrated circuit chip having a signal processing capability. In an implementation process, each of the acts of the foregoing method implementations may be completed through an integrated logic circuit of hardware in the processor or instructions in a form of software. The processor described above may be a general purpose processor, a Digital Signal Processor (DSP), an Application Specific Integrated Circuit (ASIC), a Field Programmable Gate Array (FPGA) or other programmable logic devices, a discrete gate or a transistor logic device, or a discrete hardware component. The processor may implement or perform various methods, acts and logical block diagrams disclosed in the implementations of the present disclosure. The general purpose processor may be a microprocessor, or the processor may also be any conventional processor, or the like. The acts of the methods disclosed in the implementations of the present disclosure may be directly implemented by a hardware decoding processor, or may be implemented by a combination of hardware and software modules in the decoding processor. The software modules may be located in a storage medium which is mature in the art, such as a random access memory, a flash memory, a read-only memory, a programmable read-only memory, an electrically erasable programmable memory, a register, etc. The storage medium is located in the memory, and the processor reads information in the memory and completes the acts of the foregoing methods in combination with its hardware.

It may be understood that the memory in the implementations of the present disclosure may be a volatile memory or a non-volatile memory, or may include both a volatile memory and a non-volatile memory. The non-volatile memory may be a read-only Memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. Through exemplary but non-restrictive description, many forms of RAMs may be available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct Rambus dynamic random access memory (DR RAM). It should be noted that the memories in the systems and methods described herein are intended to include, but are not limited to, these and any other suitable types of memories.

It should be understood that the foregoing memory is described in an exemplary but non-limiting sense. For example, the memory in the implementations of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), a direct Rambus RAM (DR RAM), or the like. That is, the memories in the implementations of the present disclosure are intended to include, but are not limited to, these and any other suitable type of memories.

An implementation of the present disclosure further provides a computer-readable storage medium configured to store a computer program.

Optionally, the computer readable storage medium may be applied to a network device or a base station in the implementations of the present disclosure, and the computer program enables a computer to perform the corresponding processes implemented by a network device or a base station in various methods of the implementations of the present disclosure, which will not be repeated here for brevity.

Optionally, the computer readable storage medium may be applied to a mobile terminal/terminal device in the implementations of the present disclosure, and the computer program enables a computer to perform the corresponding processes implemented by a mobile terminal/terminal device in various methods in accordance with the implementations of the present disclosure, which will not be described repeatedly for brevity.

An implementation of the present disclosure further provides a computer program product including computer program instructions.

Optionally, the computer program product may be applied to a network device or a base station in the implementations of the present disclosure, and the computer program instructions enable a computer to perform the corresponding processes implemented by a network device or a base station in various methods of the implementations of the present disclosure, which will not be repeated here for brevity.

Optionally, the computer program product may be applied to a mobile terminal/terminal device in implementations of the present disclosure, and the computer program instructions enable a computer to perform the corresponding processes implemented by a mobile terminal/terminal device in various methods of the implementations of the present disclosure, which will not be repeated here for brevity.

An implementation of the present disclosure further provides a computer program.

Optionally, the computer program may be applied to a network device or a base station in the implementations of the present disclosure. When the computer program is run on a computer, the computer is enabled to perform the corresponding processes implemented by a network device or a base station in various methods of the implementations of the present disclosure, which will not be repeated here for brevity.

Optionally, the computer program may be applied to a mobile terminal/terminal device in implementations of the present disclosure. When the computer program is run on a computer, the computer is enabled to perform the corresponding processes implemented by a mobile terminal/terminal device in various methods of the implementations of the present disclosure, which will not be repeated here for brevity.

Those of ordinary skill in the art will recognize that the exemplary elements and algorithm acts in combination with the implementations disclosed herein may be implemented in electronic hardware, or a combination of computer software and electronic hardware. Whether these functions are implemented in hardware or software depends on the specific application and design constraints of the technical solution. Those skilled in the art may use different methods to implement the described functions for each particular application, but such implementation should not be considered to be beyond the scope of the present disclosure.

Those skilled in the art may clearly understand that for the sake of convenience and conciseness of description, the specific working processes of the systems, devices and units described above may be described with reference to the corresponding processes in the above method implementations and will not be repeated herein.

In several implementations provided by the present disclosure, it should be understood that the disclosed systems, devices and methods may be implemented in another manner. For example, the device implementations described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection between apparatuses or units through some interfaces, or may be in electrical, mechanical or other forms.

The unit described as a separate component may or may not be physically separated, and the component shown as a unit may or may not be a physical unit, i.e., it may be located in one place or may be distributed across multiple network units. Part or all of the units may be selected according to actual needs to achieve the purpose of the implementations.

In addition, various functional units in various implementations of the present disclosure may be integrated into one processing unit, or may exist physically separately, or two or more than two units may be integrated into one unit.

The function, if achieved in a form of software functional units and sold or used as a separate product, may be stored in a computer-readable storage medium. Regarding such understanding, the technical solution of the present disclosure, in essence, or the part contributing to the prior art, or the part of the technical solution, may be embodied in a form of a software product, wherein the computer software product is stored in a storage medium, and includes a number of instructions for causing a computer device (which may be a personal computer, a server, or a network device, or the like) to perform all or part of the acts of the methods described in various implementations of the present disclosure. The aforementioned storage medium includes: any medium that are capable of storing program codes, such as a USB flash drive, a removable hard disk, a Read-Only Memory (ROM), a Random Access Memory (RAM), a magnetic disk, or an optical disk.

What are described above are merely specific implementations of the present disclosure, but the protection scope of the present disclosure is not limited thereto. Any variation or substitution that may be easily conceived by a person skilled in the art within the technical scope disclosed by the present disclosure shall be included within the protection scope of the present disclosure. Therefore, the protection scope of the present disclosure shall be subject to the protection scope of the claims.

What is claimed is:

1. A wireless communication method, comprising:
   receiving, by a terminal device, indication information of a network device for a first bearer, wherein the indication information indicates a secondary Radio Link Control (RLC) entity, which corresponds to a cell group different from a cell group corresponding to a primary RLC entity in at least two cell groups configured for the first bearer;
   determining, by the terminal device, cell groups corresponding to the primary RLC entity and the secondary RLC entity among at least three RLC entities according to the indication information;
   in a case that duplication transmission of the first bearer is deactivated, determining, by the terminal device, to use the primary RLC entity and the secondary RLC entity to transmit a Packet Data Convergence Protocol (PDCP) Protocol Data Units (PDU) through split transmission according to the cell groups.

2. A terminal device, comprising a processor and a transceiver, wherein the processor is configured to:
   receive indication information of a network device for a first bearer, wherein the indication information indicates a secondary Radio Link Control (RLC) entity, which corresponds to a cell group different from a cell group corresponding to a primary RLC entity in at least two cell groups configured for the first bearer;
   determine cell groups corresponding to the primary RLC entity and the secondary RLC entity among at least three RLC entities according to the indication information; and
   in a case that duplication transmission of the first bearer is deactivated, determine to use the primary RLC entity and the secondary RLC entity to transmit a Packet Data Convergence Protocol (PDCP) Protocol Data Units (PDU) through split transmission according to the cell groups.

* * * * *